(12) United States Patent
Matsushita

(10) Patent No.: US 9,939,629 B2
(45) Date of Patent: Apr. 10, 2018

(54) OPTICAL FILTER DEVICE, OPTICAL MODULE, AND ELECTRONIC APPARATUS

(71) Applicant: Seiko Epson Corporation, Tokyo (JP)

(72) Inventor: Tomonori Matsushita, Chino (JP)

(73) Assignee: Seiko Epson Corporation (JP)

( * ) Notice: Subject to any disclaimer, the term of this patent is extended or adjusted under 35 U.S.C. 154(b) by 3 days.

(21) Appl. No.: 14/546,415

(22) Filed: Nov. 18, 2014

(65) Prior Publication Data

US 2015/0138640 A1 May 21, 2015

(30) Foreign Application Priority Data

Nov. 19, 2013 (JP) .................. 2013-238591

(51) Int. Cl.

| | |
|---|---|
| G02B 27/00 | (2006.01) |
| G02B 26/00 | (2006.01) |
| G01J 3/26 | (2006.01) |
| G01J 3/51 | (2006.01) |
| G02B 5/28 | (2006.01) |
| G02B 5/22 | (2006.01) |
| G02B 5/26 | (2006.01) |
| G01J 3/12 | (2006.01) |

(52) U.S. Cl.
CPC .............. *G02B 26/001* (2013.01); *G01J 3/26* (2013.01); *G01J 3/51* (2013.01); *G02B 5/22* (2013.01); *G02B 5/26* (2013.01); *G02B 5/28* (2013.01); *G02B 5/284* (2013.01); *G01J 2003/1213* (2013.01); *G01J 2003/1234* (2013.01)

(58) Field of Classification Search
CPC ... G02B 5/22; G02B 5/26; G02B 5/28; G02B 26/001; G02B 5/284; G02B 5/20; G02B 5/30; G02B 5/285; G02B 5/288; G02B 6/29389; G01J 3/51; G01J 3/26; G01J 3/10; G01J 3/502; G01J 3/513; G03C 7/12; G02F 1/216; H01S 3/1003; H01S 3/1068; H01S 3/0632; H01S 3/08027; H01S 3/10023
USPC ........ 359/578, 584, 589, 590; 356/320, 326; 250/214 R, 226

See application file for complete search history.

(56) References Cited

U.S. PATENT DOCUMENTS

| | | | |
|---|---|---|---|
| 2,708,389 A | | 5/1955 | Kavanagh |
| 9,207,516 B1 * | | 12/2015 | Yu ........................... G02F 1/216 |

(Continued)

FOREIGN PATENT DOCUMENTS

| | | |
|---|---|---|
| EP | 0543578 A1 | 5/1993 |
| EP | 2574971 A1 | 4/2013 |

(Continued)

OTHER PUBLICATIONS

Extended Search Report for European Patent Application No. 14193430.7 dated May 7, 2015 (8 pages).

*Primary Examiner* — Mustak Choudhury
(74) *Attorney, Agent, or Firm* — Harness, Dickey & Pierce, P.L.C.

(57) ABSTRACT

An optical filter device includes a variable wavelength interference filter having a pair of reflecting films opposed to each other, and an electrostatic actuator adapted to change a gap dimension between the pair of reflecting films, and at least one bandpass filter disposed on an optical axis of the pair of reflecting films, and the bandpass filter includes a plurality of transmission wavelength bands in which light is transmitted.

15 Claims, 14 Drawing Sheets

(56) References Cited

U.S. PATENT DOCUMENTS

| | | | |
|---|---|---|---|
| 2002/0026981 A1* | 3/2002 | Fukushima | G02B 5/20 156/264 |
| 2004/0085660 A1* | 5/2004 | Hara | G02B 5/287 359/883 |
| 2005/0133693 A1 | 6/2005 | Fouquet et al. | |
| 2006/0203100 A1* | 9/2006 | Ajito | H04N 5/332 348/220.1 |
| 2009/0296246 A1 | 12/2009 | Yamada et al. | |
| 2011/0299073 A1* | 12/2011 | Sakurai | G01J 3/10 356/319 |
| 2012/0038995 A1 | 2/2012 | Yamada et al. | |
| 2013/0075596 A1* | 3/2013 | Matsuno | G02B 26/001 250/226 |

FOREIGN PATENT DOCUMENTS

| | | |
|---|---|---|
| JP | 01-094312 A | 4/1989 |
| JP | 2001-525075 A | 12/2001 |
| JP | 2009-251105 A | 10/2009 |
| JP | 2010-009025 A | 1/2010 |
| JP | 2010-206626 A | 9/2010 |
| JP | 2011-117884 A | 6/2011 |
| JP | 2013-083685 A | 5/2013 |
| JP | 2013-113900 A | 6/2013 |
| WO | WO-98-14804 A1 | 4/1998 |

* cited by examiner

OPTICAL FILTER DEVICE, OPTICAL MODULE, AND ELECTRONIC APPARATUS

BACKGROUND

1. Technical Field

The present invention relates to an optical filter device, an optical module, and an electronic apparatus.

2. Related Art

In the past, there has been known a measurement device for measuring the light intensity of light having a predetermined wavelength out of incident light using a Fabry-Perot etalon element (an optical filter device) (see, e.g., JP-A-01-94312 (Document 1)).

In the device described in Document 1, the distance between a pair of reflecting films constituting the optical filter device is varied by controlling an applied voltage to an actuator, and the light having a wavelength corresponding to a gap dimension between the reflecting films is transmitted and then received by a light receiving element.

Incidentally, in such a measurement device as described in Document 1 described above, in the case in which it is required to measure spectroscopic characteristics with respect to a broad wavelength band, it is preferable to use a metal film made of Ag alloy or the like as the pair of reflecting films constituting the optical filter device. However, in the case of using such a metal film, the half bandwidth of the light transmitted through the optical filter device becomes large, and the resolution is decreased. Therefore, it results that the light in the broad wavelength band centered on the wavelength on which the light intensity measurement has been performed is emitted from the optical filter device, and there is a problem that it is not achievable to obtain an accurate measurement result.

SUMMARY

An advantage of some aspects of the invention is to provide an optical filter device, an optical module, and an electronic apparatus capable of emitting the light having a desired wavelength with accuracy.

An optical filter device according to an aspect of the invention includes a variable wavelength interference filter having a pair of reflecting films opposed to each other, and a gap changing section adapted to change a gap dimension between the pair of reflecting films, and at least one bandpass filter disposed on an optical axis of the pair of reflecting films, the bandpass filter is provided with optical characteristics including a plurality of transmission wavelength bands in which light is transmitted, and the transmission wavelength bands are different from each other.

In this aspect of the invention, in the optical characteristics (light transmittance characteristics) of the bandpass filter, there is provided a plurality of transmission wavelength bands. Specifically, in the bandpass filter, the transmission wavelength bands in which the light is transmitted and non-transmission wavelength bands in which the light is not transmitted (e.g., the transmittance is equal to or lower than a predetermined value) are arranged alternately with respect to a predetermined wavelength band. In such a configuration, by changing the gap distance between the pair of reflecting films using the gap changing section, the peak wavelength of the light to be emitted from the variable wavelength interference filter is adjusted to fall within the transmission wavelength bands of the bandpass filter. As the light emitted from the variable wavelength interference filter, the light in a predetermined wavelength band centered on the peak wavelength corresponding to the gap distance is emitted. However, in the configuration described above, it results that the light (the light in the non-transmission wavelength bands) outside the transmission wavelength bands is blocked by the bandpass filter, and the light in the transmission wavelength bands is transmitted. On this occasion, it results that the light is transmitted in other transmission wavelength bands than the transmission wavelength band corresponding to the peak wavelength. However, since the light intensity of the light included in other transmission wavelength bands emitted from the variable wavelength interference filter becomes sufficiently low, the influence on the measurement accuracy is small.

For the reason described above, in this aspect of the invention, it is possible to accurately emit the light with a desired wavelength from the optical filter device to thereby achieve the improvement in resolution.

In the optical filter device according to the aspect of the invention described above, it is preferable that each of the transmission wavelength bands is smaller than a half bandwidth of light emitted from the variable wavelength interference filter.

With this configuration, each of the transmission wavelength bands of the bandpass filter is smaller than the half bandwidth of the light emitted from the variable wavelength interference filter. In such a configuration, the light in the wavelength band smaller than the half bandwidth including the peak wavelength is emitted from the optical filter device. In the case in which the bandwidth of the transmission wavelength band is equal to or larger than the half bandwidth, the light intensity of the light with an unwanted wavelength component increases besides the light with the peak wavelength as the desired wavelength, and thus, a sufficient improvement in resolution cannot be achieved. In contrast, by setting the bandwidth of the transmission wavelength band to be smaller than the half bandwidth as in the configuration described above, a further improvement in resolution of the optical filter device can be achieved.

In the optical filter device according to the aspect of the invention described above, it is preferable that intervals between the transmission wavelength bands are each larger than a half of a half bandwidth of light emitted from the variable wavelength interference filter.

With this configuration, the interval between the two transmission wavelength bands across the non-transmission wavelength band, namely the bandwidth of the non-transmission wavelength band is larger than a half of the half bandwidth of the light emitted from the variable wavelength interference filter.

In the case in which the width of the non-transmission wavelength band is equal to or smaller than a half of the half bandwidth, the light intensity of the light transmitted in the previous or next transmission wavelength band of the transmission wavelength band corresponding to the peak wavelength increases, and the light with an unwanted wavelength component cannot sufficiently be cut in the non-transmission wavelength bands. In contrast, according to the configuration described above, since the width of the non-transmission wavelength band is equal to or larger than a half of the half bandwidth, the light with an unwanted wavelength component can sufficiently be cut in the non-transmission wavelength bands, and thus, the light intensity of the light with the unwanted wavelength component also becomes low. Thus, the improvement in resolution of the optical filter device can be achieved.

In the optical filter device according to the aspect of the invention described above, it is preferable that a plurality of the bandpass filters are disposed on the optical axis.

With this configuration, the plural bandpass filters having the same transmission wavelength bands and the same non-transmission wavelength bands as each other are disposed. In the case of being transmitted through the plurality of bandpass filters, the transmittance in the non-transmission wavelength band becomes a product of the transmittances of the non-transmission wavelength bands of the respective bandpass filters. For example, in the case in which the transmittance of the non-transmission wavelength band in one bandpass filter is 1%, by using two bandpass filters, the transmittance in the non-transmission wavelength band becomes 0.01%. Therefore, in the configuration described above, the transmittance of the light in the non-transmission wavelength band can further be reduced to make it possible to more surely cut the light with an unwanted wavelength component, and therefore, it is possible to achieve further improvement in resolution of the optical filter device.

In the optical filter device according to the aspect of the invention described above, it is preferable that the bandpass filter is disposed on a light entrance side where the light enters the variable wavelength interference filter.

In the case in which the bandpass filter is disposed on the light exit side of the variable wavelength interference filter, the light emitted from the variable wavelength interference filter is reflected by the bandpass filter and then enters the variable wavelength interference filter again in some cases, and in this case, there is a possibility that the noise component increases to decrease the resolution. In contrast, by disposing the bandpass filter on the light entrance side as in the configuration described above, such a risk as described above can be reduced to thereby achieve an improvement in resolution of the optical filter device.

In the optical filter device according to the aspect of the invention described above, it is preferable that the bandpass filter is formed of a dielectric multilayer film.

With this configuration, the bandpass filter is formed of the dielectric multilayer film. In this case, by controlling the film thickness of the high-refractive index layers and the low-refractive index layers, the bandpass filter can easily be formed, and thus, the manufacturing efficiency can be improved.

In the optical filter device according to the aspect of the invention described above, it is preferable that a transmittance of light in a wavelength band other than the plurality of transmission wavelength bands of the bandpass filter is one of equal to and lower than 10%.

With this configuration, since the transmittance of the light in the non-transmission wavelength bands is equal to or lower than 10%, the emission of the light with an unwanted wavelength component in the non-transmission wavelength bands can be suppressed, and thus, the improvement in resolution of the optical filter device can be achieved.

In the optical filter device according to the aspect of the invention described above, it is preferable that the variable wavelength interference filter is provided with a substrate on which either one of the pair of reflecting films is disposed, and the bandpass filter is disposed on the substrate.

With this configuration, the bandpass filter is disposed on the substrate on which the reflecting film of the variable wavelength interference filter is disposed. Therefore, the variable wavelength interference filter and the bandpass filter can be integrated with each other, and thus, miniaturization of the optical filter device can be achieved.

In the optical filter device according to the aspect of the invention described above, it is preferable that the optical filter device includes a housing adapted to house the variable wavelength interference filter.

With this configuration, since the variable wavelength interference filter is housed in the housing, the optical filter device can be protected from an external force. Further, since the invasion of electrically-charged particles or the like can be inhibited, a decrease in performance (e.g., a problem that the gap dimension fluctuates due to the Coulomb force caused by the electrically-charged particles) due to the adhesion of the electrically-charged particles to the reflecting films and so on can be inhibited.

In the optical filter device according to the aspect of the invention described above, it is preferable that the housing is provided with a light transmissive member disposed on the optical axis of the pair of reflecting films, and adapted to transmit the light, and the bandpass filter is disposed on the light transmissive member.

With this configuration, the bandpass filter is disposed on the light transmissive member of the housing. In such a configuration, it is possible to use a variable wavelength interference filter of the related art, and thus, increase in use can be achieved.

An optical module according to another aspect of the invention includes an optical filter device including a variable wavelength interference filter having a pair of reflecting films opposed to each other, and a gap changing section adapted to change a gap dimension between the pair of reflecting films, and at least one bandpass filter disposed on an optical axis of the pair of reflecting films, and a light receiving section adapted to receive light emitted from the optical filter device, the bandpass filter is provided with optical characteristics including a plurality of transmission wavelength bands in which light is transmitted, and the transmission wavelength bands are different from each other.

In this aspect of the invention, similarly to the aspect of the invention described above, the resolution of the optical filter device can be improved. Therefore, by receiving the light taken from the optical filter device in the light receiving section, the light intensity of the light with the desired wavelength can accurately be detected.

An electronic apparatus according to still another aspect of the invention includes an optical filter device including a variable wavelength interference filter having a pair of reflecting films opposed to each other, and a gap changing section adapted to change a gap dimension between the pair of reflecting films, and at least one bandpass filter disposed on an optical axis of the pair of reflecting films, and a control section adapted to control the optical filter device, the bandpass filter is provided with optical characteristics including a plurality of transmission wavelength bands in which light is transmitted, and the transmission wavelength bands are different from each other.

In this aspect of the invention, similarly to the aspect of the invention described above, it is possible to emit the light from the optical filter device with high resolution. Therefore, it is possible for the electronic apparatus to perform an accurate process based on the light.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment of the invention will hereinafter be explained based on the accompanying drawings.
Configuration of Spectroscopic Measurement Device FIG. 1 is a block diagram showing a schematic configuration of a spectroscopic measurement device according to the invention.

The spectroscopic measurement device 1 is an example of an electronic apparatus according to the invention, and is a device for analyzing the light intensity at each wavelength in measurement target light having been reflected by a measurement object X to thereby measure the dispersion spectrum. It should be noted that although in the description of the present embodiment, there is described an example of measuring the measurement target light reflected by the measurement object X, in the case of using a light emitting body such as a liquid crystal panel as the measurement object X, it is possible to use the light emitted from the light emitting body as the measurement target light.

Figure 1:
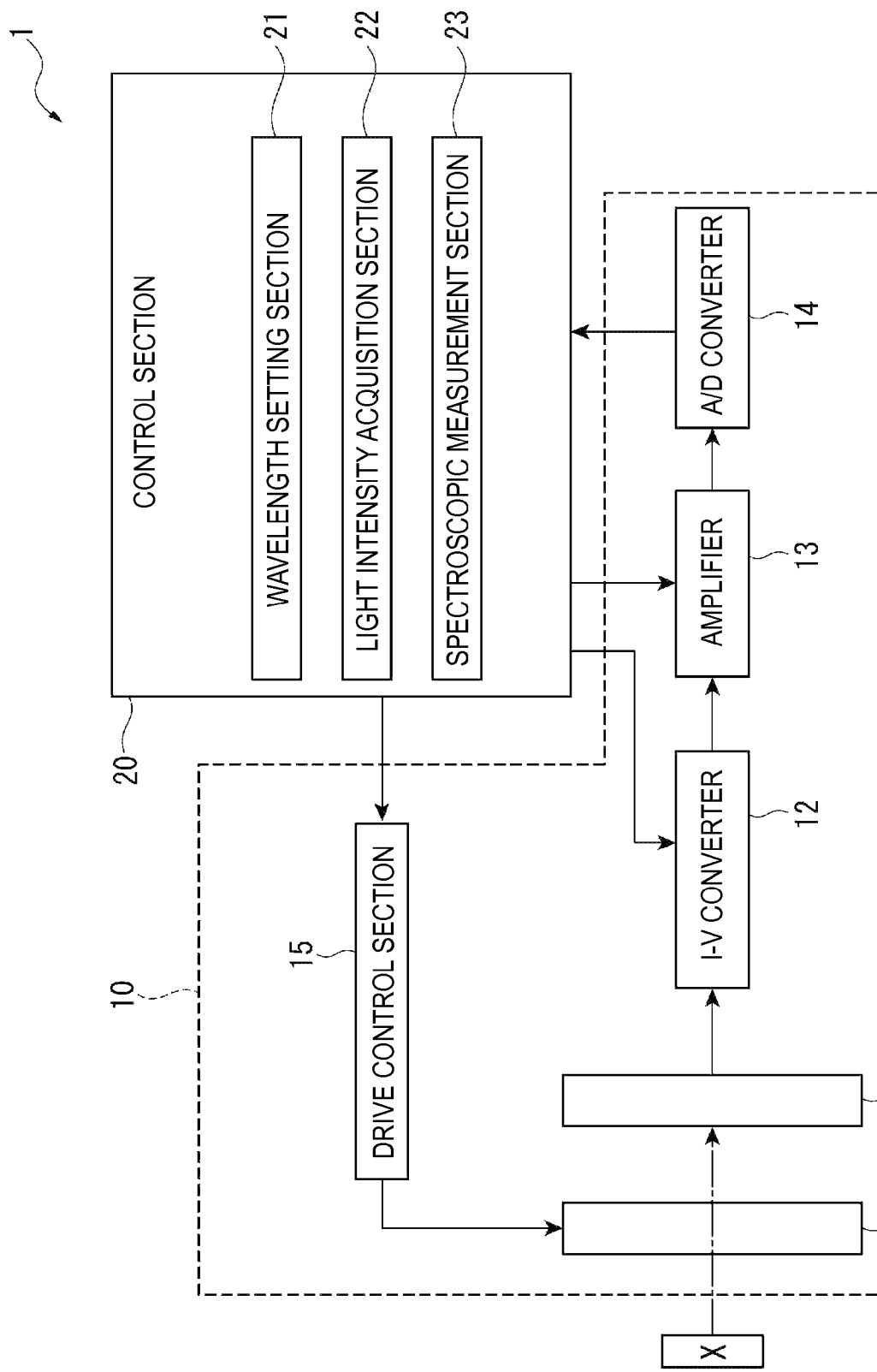
FIG. 1 is a block diagram showing a schematic configuration of a spectroscopic measurement device according to a first embodiment of the invention.

Further, as shown in FIG. 1, the spectroscopic measurement device 1 is provided with an optical module 10, and a control section 20 for processing a signal output from the optical module 10.
Configuration of Optical Module The optical module 10 is provided with an optical filter device 500, a detector 11, an I-V converter 12, an amplifier 13, an A/D converter 14, and a drive control section 15.

The optical module 10 guides the measurement target light reflected by the measurement object X to the optical filter device 500 through an incident optical system (not shown), and then receives the light, which has been transmitted through the optical filter device 500, using the detector 11 (a light receiving section). Then, a detection signal output from the detector 11 is output to the control section 20 via the I-V converter 12, the amplifier 13, and the A/D converter 14.
Configuration of Optical Filter Device FIG. 2 is a plan view showing a schematic configuration of the optical filter device 500, and FIG. 3 is a cross-sectional view showing the schematic configuration of the optical filter device 500 cut along the A-A line shown in FIG. 2.

Figure 3:
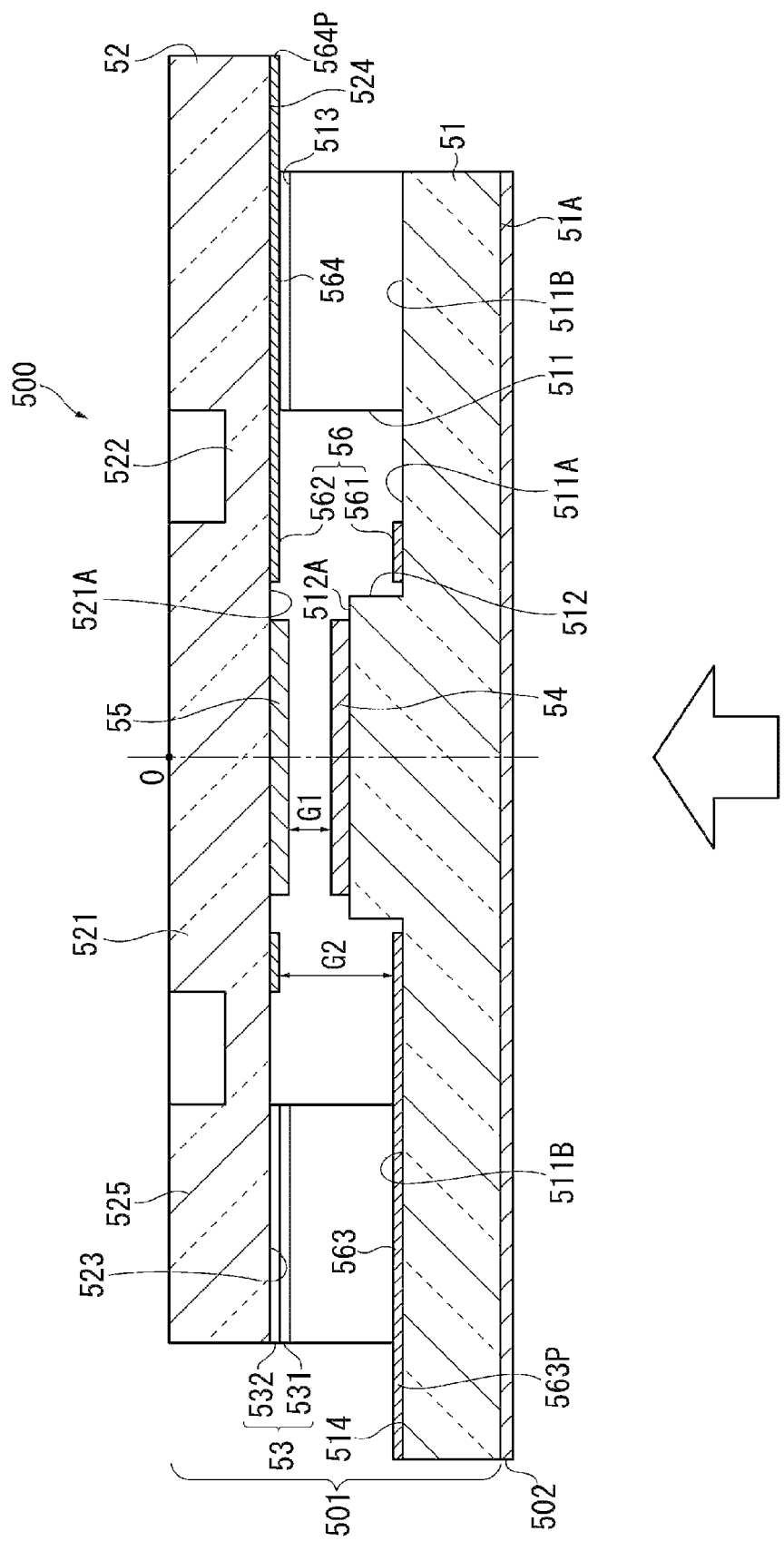
FIG. 3 is a cross-sectional view along the A-A line shown in FIG. 2.

As shown in FIG. 3, the optical filter device 500 according to the present embodiment is provided with a variable wavelength interference filter 501 and a bandpass filter 502.

Figure 2:
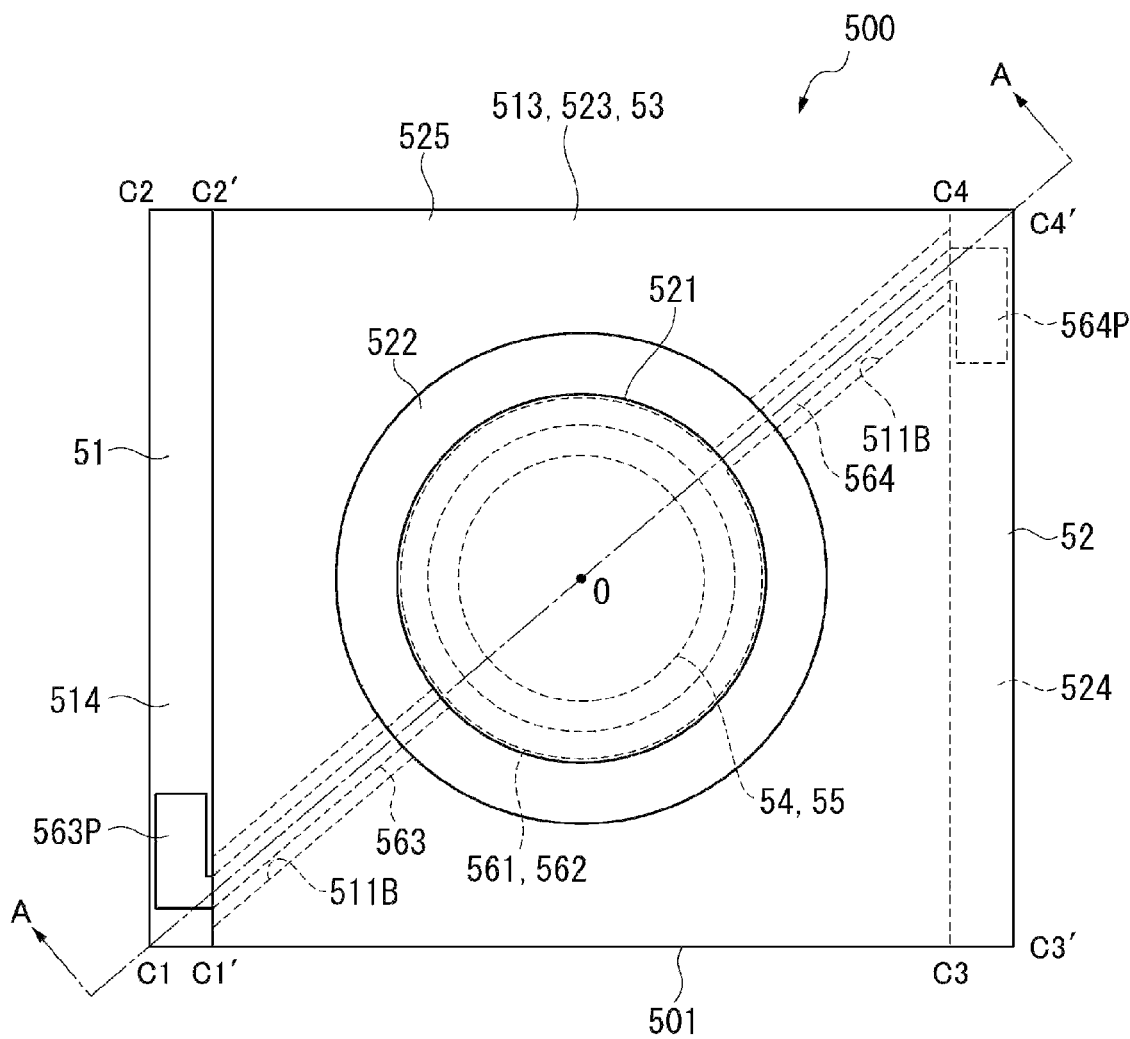
FIG. 2 is a plan view showing a schematic configuration of a variable wavelength interference filter according to the first embodiment.

As shown in FIGS. 2 and 3, the variable wavelength interference filter 501 is provided with a stationary substrate 51 and a movable substrate 52. The stationary substrate 51 and the movable substrate 52 are each made of, for example, a variety of types of glass such as soda glass, crystalline glass, quartz glass, lead glass, potassium glass, borosilicate glass, or alkali-free glass, or a quartz crystal. It should be noted that in the case in which the measurement target wavelength band to be measured by the spectroscopic measurement device 1 is, for example, an infrared wavelength band, the stationary substrate 51 and the movable substrate 52 can also be formed of Si or the like. Further, as shown in FIG. 3, the stationary substrate 51 and the movable substrate 52 are integrally configured by being bonded with bonding films (a first bonding film 531 and a second bonding film 532). Specifically, a first bonding section 513 of the stationary substrate 51 and the second bonding section 523 of the movable substrate 52 are bonded to each other with the bonding films 53 each formed of, for example, a plasma-polymerized film consisting primarily of siloxane.

It should be noted that in the explanation below, the planar view viewed from the thickness direction of the stationary substrate 51 or the movable substrate 52, namely the plan view of the optical filter device 500 viewed from the stacking direction of the stationary substrate 51, the bonding films 53, and the movable substrate 52, is referred to as a filter planar view.

As shown in FIG. 3, the stationary substrate 51 is provided with a stationary reflecting film 54 constituting one of a pair of reflecting films according to the invention. Further, the movable substrate 52 is provided with a movable reflecting film 55 constituting the other of the pair of reflecting films according to the invention. The stationary reflecting film 54 and the movable reflecting film 55 are disposed so as to be opposed to each other via an inter-reflecting film gap G1.

Further, the variable wavelength interference filter 501 is provided with an electrostatic actuator 56 (a gap changing section) used for adjusting the distance (the gap dimension)

of the gap G1. The electrostatic actuator 56 is provided with a stationary electrode 561 provided to the stationary substrate 51 and a movable electrode 562 provided to the movable substrate 52, and is constituted by the electrodes 561, 562 opposed to each other. The stationary electrode 561 and the movable electrode 562 are opposed to each other via an inter-electrode gap G2. Here, there can be adopted a configuration of disposing these electrodes 561, 562 directly on the surfaces of the stationary substrate 51 and the movable substrate 52, respectively, or a configuration of disposing these electrodes 561, 562 via other film members.

It should be noted that although in the present embodiment, a configuration in which the gap G1 is formed to be smaller than the inter-electrode gap G2 is described as an example, it is also possible to form the gap G1 to be larger than the inter-electrode gap G2 depending on the wavelength band in which the variable wavelength interference filter 501 transmits the light.

Further, in the filter planar view, a side C1-C2 of the stationary substrate 51 projects outward from the side C1'-C2' of the movable substrate 52, and forms a stationary-side electric component mounting section 514. Further, a side C3'-C4' of the movable substrate 52 projects outward from the side C3-C4 of the stationary substrate 51, and forms a movable-side electric component mounting section 524.

Configuration of Stationary Substrate

As shown in FIG. 3, the stationary substrate 51 is disposed on the light incident side in the optical filter device 500 (the variable wavelength interference filter 501).

The stationary substrate 51 is provided with an electrode arrangement groove 511 and a reflecting film installation section 512 formed by etching.

The electrode arrangement groove 511 is formed to have a ring-like shape cantered on the filter center point O of the stationary substrate 51 in the filter planar view. The reflecting film installation section 512 is formed so as to protrude toward the movable substrate 52 from the central portion of the electrode arrangement groove 511 in the planar view described above. The bottom surface of the electrode arrangement groove 511 forms an electrode installation surface 511A on which the stationary electrode 561 is disposed. Further, the projection tip surface of the reflecting film installation section 512 forms a reflecting film installation surface 512A.

Further, the stationary substrate 51 is provided with a connection electrode grooves 511B formed in an area extending from the electrode arrangement groove 511 to the stationary-side electric component mounting section 514 and an area extending from the electrode arrangement groove 511 to the side C3-C4, respectively. It should be noted that in the present embodiment, the electrode installation surface 511A, the bottom sections of the connection electrode grooves 511B, and the surface of the stationary-side electric component mounting section 514 are coplanar with each other.

The electrode installation surface 511A is provided with the stationary electrode 561 constituting the electrostatic actuator 56. More specifically, the stationary electrode 561 is disposed in an area of the electrode installation surface 511A, the area being opposed to the movable electrode 562 of the movable section 521 described later. Further, it is also possible to adopt a configuration in which an insulating film for ensuring an insulation property between the stationary electrode 561 and the movable electrode 562 is stacked on the stationary electrode 561.

Further, the stationary substrate 51 is provided with a stationary connection electrode 563 connected to an outer circumference edge of the stationary electrode 561. The stationary connection electrode 563 is disposed throughout the connection electrode groove 511B extending from the electrode arrangement groove 511 to the stationary-side electric component mounting section 514, and the stationary-side electric component mounting section 514. The stationary connection electrode 563 forms a stationary electrode pad 563P to be electrically connected to an internal terminal section described later in the stationary-side electric component mounting section 514.

It should be noted that although in the present embodiment, there is shown a configuration of providing the single stationary electrode 561 to the electrode installation surface 511A, it is also possible to adopt a configuration, for example, (a dual electrode configuration) having two concentric electrodes centered on the filter center point O. Besides the above, it is also possible to use a configuration of disposing a transparent electrode on the stationary reflecting film 54, or a electrically conductive stationary reflecting film 54, and form a connection electrode extending from the stationary reflecting film 54 to the stationary-side electric component mounting section 514, and in such a case it is possible to adopt a configuration of being partially cut out in accordance with the position of the connection electrode as the stationary electrode 561.

As described above, the reflecting film installation section 512 is formed to have a roughly columnar shape coaxial with the electrode arrangement groove 511 and having a diameter smaller than that of the electrode arrangement groove 511, and is provided with the reflecting film installation surface 512A of the reflecting film installation section 512 opposed to the movable substrate 52.

As shown in FIG. 3, the stationary reflecting film 54 is installed in the reflecting film installation section 512. As the stationary reflecting film 54, a metal film made of, for example, Ag, or an alloy film made of, for example, an Ag alloy can be used. Such a metal film or an alloy film has a high reflecting property with respect to a broad wavelength band including, for example, the visible light range through the near infrared range. Therefore, in the variable wavelength interference filter 501, by changing the gap G1 between the reflecting films 54, 55, the light in the broad wavelength band from the visible light range through the near infrared range can be selected and then emitted.

It should be noted that in the present embodiment, although such a reflecting film 54 as described above is used so that the spectroscopic measurement in the visible light range through the near infrared range becomes possible in the spectroscopic measurement device 1, in the case in which, for example, the target wavelength band in which the measurement is performed by the spectroscopic measurement device 1 is narrow, a dielectric multilayer film can also be used. Further, it is also possible to use a reflecting film obtained by stacking a metal film (or an alloy film) on a dielectric multilayer film, a reflecting film obtained by stacking a dielectric multilayer film on a metal film (or an alloy film), a reflecting film obtained by laminating a single refractive layer (made of, e.g., $TiO_2$ or $SiO_2$) and a metal film (or an alloy film) with each other, and so on.

Further, a surface, on which either of the electrode arrangement groove 511, the reflecting film installation section 512, and the connection electrode groove 511B is not formed by etching out of the surface of the stationary substrate 51, which is opposed to the movable substrate 52, constitutes the first bonding section 513. The first bonding section 513 is provided with the first bonding film 531, and by bonding the first bonding film 531 to the second bonding film 532 provided to the movable substrate 52, the stationary substrate 51 and the movable substrate 52 are bonded to each other as described above.

Configuration of Movable Substrate

The movable substrate 52 is provided with a movable section 521 having a circular shape centered on the filter center point O, and a holding section 522 coaxial with the movable section 521 and for holding the movable section 521.

The movable section 521 is formed to have a thickness dimension larger than that of the holding section 522. The movable section 521 is formed to have a diameter dimension larger than at least the diameter dimension of the outer circumferential edge of the reflecting film installation surface 512A in the filter planar view. Further, the movable section 521 is provided with the movable electrode 562 and the movable reflecting film 55.

It should be noted that an antireflection film can also be formed on the opposite surface of the movable section 521 to the stationary substrate 51 similarly to the stationary substrate 51. Such an antireflection film can be formed by alternately stacking low-refractive index films and high-refractive index films, and is capable of decreasing the reflectance of the visible light on the surface of the movable substrate 52, and increasing the transmittance thereof.

The movable electrode 562 is opposed to the stationary electrode 561 via the gap G2, and is formed to have a ring-like shape, which is the same shape as that of the stationary electrode 561. The movable electrode 562 constitutes the electrostatic actuator 56 together with the stationary electrode 561. Further, the movable substrate 52 is provided with a movable connection electrode 564 connected to an outer circumference edge of the movable electrode 562. The movable connection electrode 564 is disposed throughout an area extending from the movable section 521 to the movable-side electric component mounting section 524 via an area opposed to the connection electrode groove 511B disposed on the side C3-C4 side of the stationary substrate 51, and forms a movable electrode pad 564P to be electrically connected to an internal terminal section in the movable-side electric component mounting section 524.

The movable reflecting film 55 is disposed at the central portion of a movable surface 521A of the movable section 521 so as to be opposed to the stationary reflecting film 54 via the gap G1. As the movable reflecting film 55, a reflecting film having the same configuration as that of the stationary reflecting film 54 described above is used.

It should be noted that although the example in which the gap G2 is larger in dimension than the gap G1 is described in the present embodiment as described above, the invention is not limited to this example. In the case of, for example, using an infrared beam or a far infrared beam as the measurement target light, it is also possible to adopt a configuration in which the gap G1 is larger in dimension than the gap G2 depending on the wavelength band of the measurement target light.

The holding section 522 is a diaphragm surrounding the periphery of the movable section 521, and is formed to have a thickness dimension smaller than that of the movable section 521. Such a holding section 522 is easier to be deflected than the movable section 521, and it becomes possible to displace the movable section 521 toward the stationary substrate 51 with a weak electrostatic attractive force. On this occasion, since the movable section 521 has a larger thickness dimension and higher rigidity than those of the holding section 522, the shape variation of the movable section 521 does not occur even in the case in which the holding section 522 is pulled toward the stationary substrate 51 due to the electrostatic attractive force. Therefore, deflection of the movable reflecting film 55 provided to the movable section 521 does not occur, and it becomes possible to always keep the stationary reflecting film 54 and the movable reflecting film 55 in a parallel state.

It should be noted that although in the present embodiment, the holding section 522 having a diaphragm shape is shown as an example, the holding section is not limited thereto, but a configuration of, for example, providing beam-like holding sections arranged at regular angular intervals centered on the filter center point O can also be adopted.

In the movable substrate 52, the area opposed to the first bonding section 513 is the second bonding section 523. The second bonding section 523 is provided with the second bonding film 532, and as described above, by bonding the second bonding film 532 to the first bonding film 531, the stationary substrate 51 and the movable substrate 52 are bonded to each other.

Optical Characteristics of Variable Wavelength Interference Filter

Then, optical characteristics (spectral characteristics) of such a variable wavelength interference filter 501 as described above will be explained.

Figure 4:
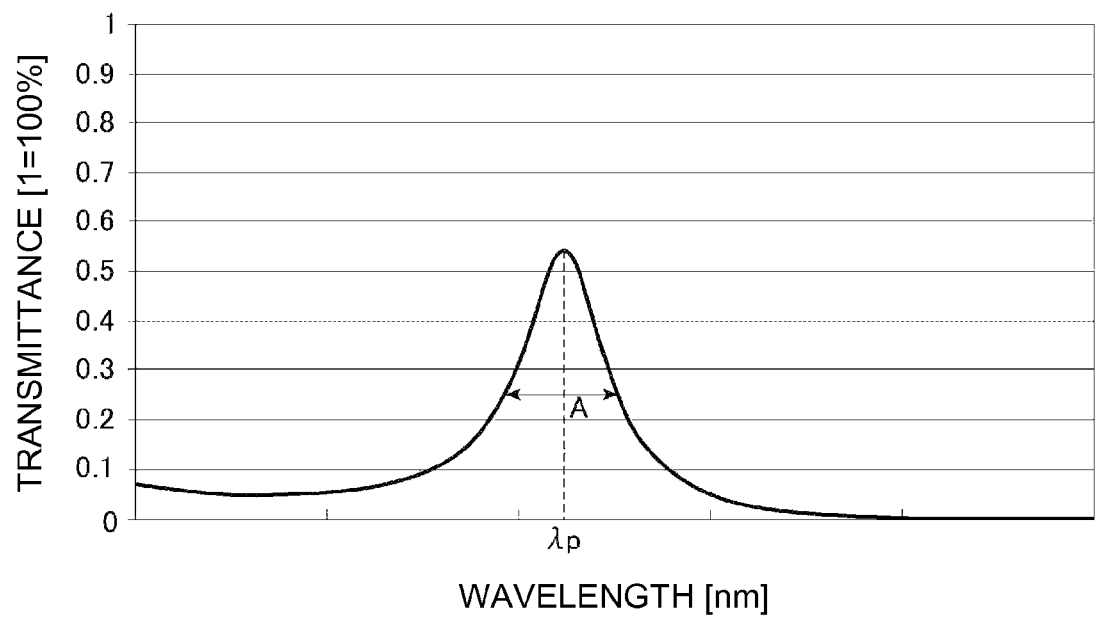
FIG. 4 is a diagram showing optical characteristics of a variable wavelength interference filter according to the first embodiment.

FIG. 4 shows the spectral characteristics obtained when the dimension of the gap G1 between the reflecting films 54, 55 is changed to transmit the light with the peak wavelength of 520 nm in the variable wavelength interference filter 501.

The light transmitted through the variable wavelength interference filter 501 varies in peak wavelength $\lambda p$ in accordance with the dimension of the gap G1 between the reflecting films 54, 55. Further, in each of the reflecting films 54, 55, the reflectance and the transmittance vary in accordance with the film thickness, and thus, the half bandwidth A is determined. If the film thickness of each of the reflecting films 54, 55 is increased, the half bandwidth A decreases, but the transmittance (the intensity of the transmitted light) decreases. In contrast, if the film thickness is decreased, the half bandwidth A increases, but the intensity of the transmitted light increases.

In the present embodiment, the light is sequentially transmitted through the variable wavelength interference filter 501 at intervals of 20 nm with respect to the measurement target wavelength band from the visible light range through the near infrared range using the spectroscopic measurement device 1. On this occasion, it is preferable to set the film thickness dimensions of the reflecting films 54, 55 so that the half bandwidth A of the light transmitted through the variable wavelength interference filter 501 becomes about 30 nm.

It should be noted that the half bandwidth A in the case in which the light is transmitted through the variable wavelength interference filter 501 varies with the wavelength of the light to be transmitted, and in the present embodiment, it is assumed to use an average value of the half bandwidths of the respective wavelengths to be the measurement target, for example, in order to make the explanation simple.

Configuration of Bandpass Filter

As shown in FIG. 3, the bandpass filter 502 constituting the optical filter device 500 is disposed on a surface of the stationary substrate 51 of the variable wavelength interference filter 501 on the opposite side to the movable substrate 52. In other words, the bandpass filter 502 is disposed on the light entrance side of the variable wavelength interference filter 501 and on the optical axis of the reflecting films 54, 55.

The bandpass filter 502 is formed of, for example, a dielectric multilayer film obtained by stacking $TiO_2$ as high-refractive index layers and $SiO_2$ as low-refractive index layers on each other. By forming the bandpass filter 502 with such a dielectric multilayer film, it becomes possible to easily form the bandpass filter 502 using, for example, an evaporation method or a sputtering method with respect to the stationary substrate 51.

Optical Characteristics of Bandpass Filter

Figure 5:
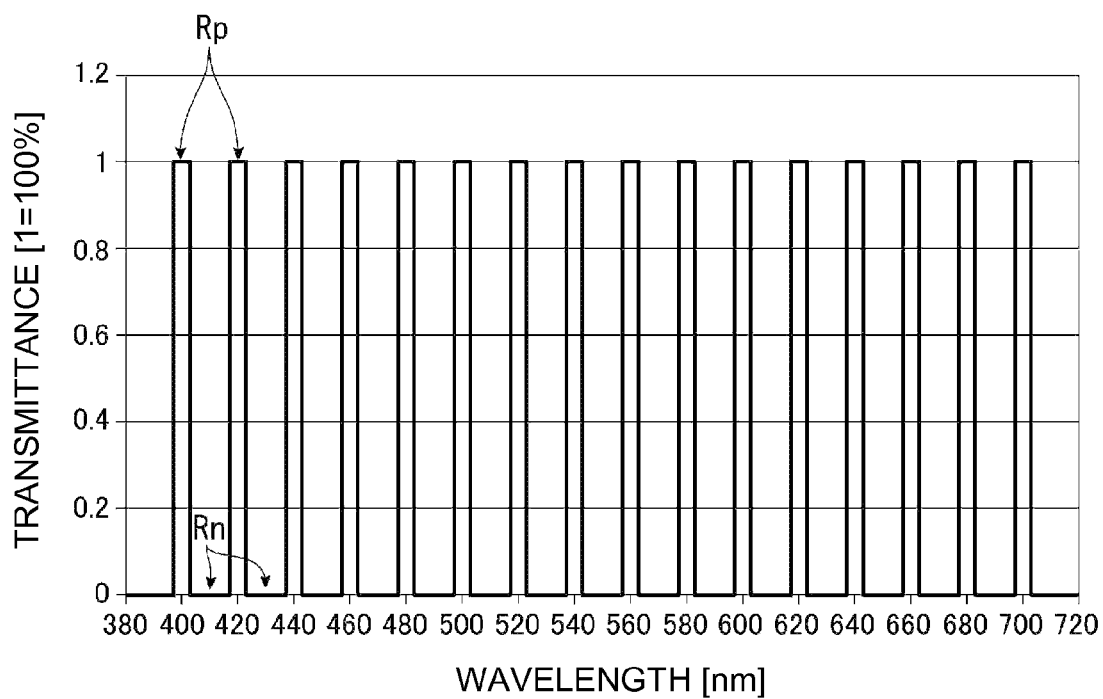
FIG. 5 is a diagram showing optical characteristics of a bandpass filter according to the first embodiment.

FIG. 5 is a diagram showing the transmission characteristics of the bandpass filter 502 of the present embodiment.

The transmission characteristics of the bandpass filter 502 have a plurality of transmission wavelength bands Rp and non-transmission wavelength bands Rn among the transmission wavelength bands Rp with respect to the measurement target wavelength band. In other words, when scanning the measurement target wavelength band from a shorter wavelength side toward a longer wavelength side, the transmission wavelength bands Rp and the non-transmission wavelength bands Rn appear alternately. In this case, it is preferable that the bandwidth of each of the transmission wavelength bands Rp is set to be smaller than the half bandwidth A of the variable wavelength interference filter 501, for example, equal to or longer than 3 nm. In the description of the present embodiment, there is shown an example in which the bandwidth of each of the transmission wavelength bands Rp is 4 nm. Further, it is preferable that the distance between the transmission wavelength bands Rp adjacent to each other, namely the bandwidth of the non-transmission wavelength band Rn, is set to be equal to or longer than a half of the half bandwidth A of the light transmitted from the variable wavelength interference filter 501. In the description of the present embodiment, there is shown an example in which a half of the half bandwidth A of the light transmitted through the variable wavelength interference filter 501 is about 15 nm, and the bandwidth of the non-transmission wavelength band Rn is 16 nm.

Further, it is preferable that the transmittance in the non-transmission wavelength band Rn is set to be equal to or lower than 10%, and thus, the light in the non-transmission wavelength bands Rn can appropriately be blocked.

Optical Characteristics of Optical Filter Device

Figure 6:
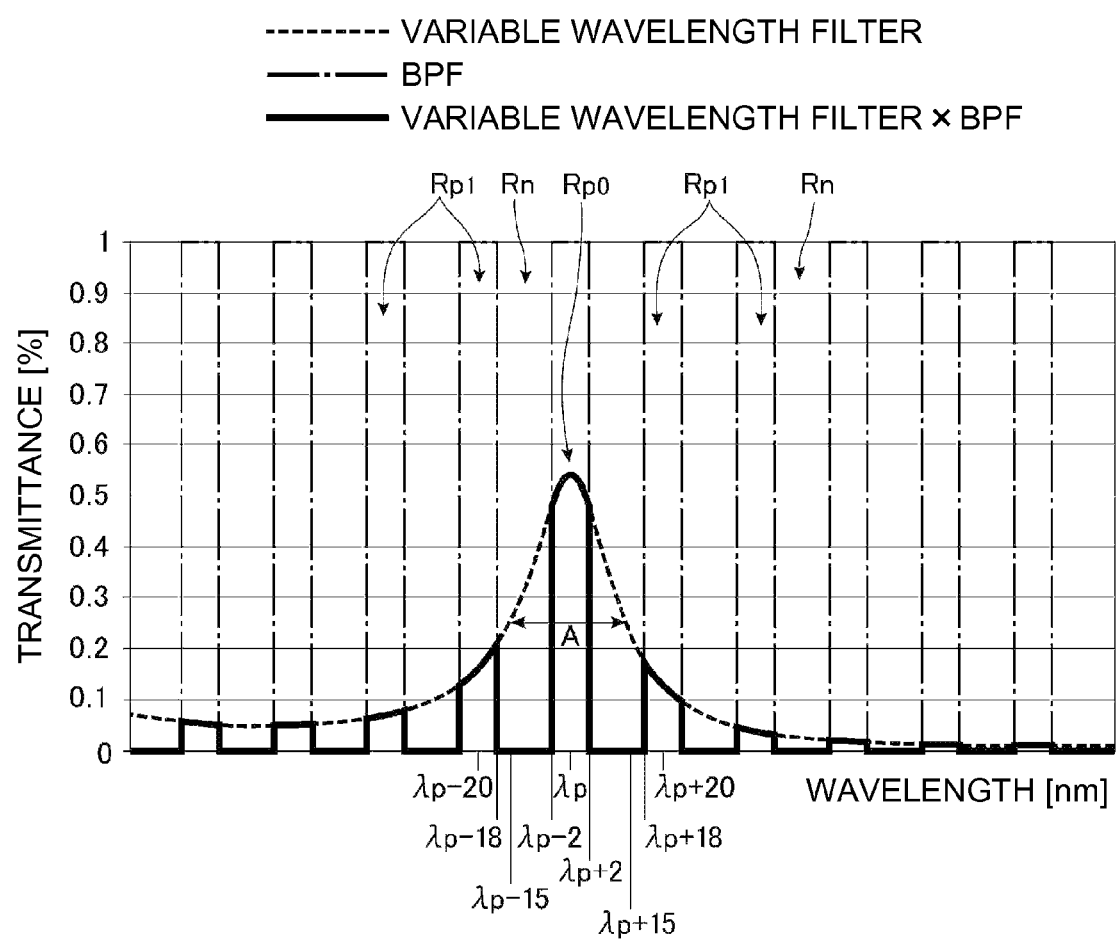
FIG. 6 is a diagram showing optical characteristics of an optical filter device according to the first embodiment.

FIG. 6 is a diagram showing optical characteristics of the optical filter device obtained by combining the optical characteristics of the variable wavelength interference filter 501 and the bandpass filter 502.

The light having transmitted through the variable wavelength interference filter 501 becomes to have a light intensity distribution having the half bandwidth A of about 30 nm centered on the peak wavelength $\lambda p$ as represented by the dotted line shown in FIG. 6, and the light with an unwanted wavelength component other than the light with the peak wavelength $\lambda p$, which needs to be measured in the spectroscopic measurement device 1, is also mixed therein.

In contrast, in the present embodiment, as represented by the solid line in FIG. 6, the light in the transmission wavelength bands Rp ($Rp_0$: $\lambda p-2 \leq \lambda \leq \lambda p+2$) including the peak wavelength $\lambda p$ is transmitted, and the light with the unwanted wavelength component in the wavelength band in the non-transmission wavelength bands Rn (e.g., $\lambda p-18 \leq \lambda \leq \lambda p-2$, $\lambda p+2 \leq \lambda \leq \lambda p+18$) is cut.

It should be noted that it results that the light in the anterior and posterior transmission wavelength bands $Rp_1$ other than the transmission wavelength band $Rp_0$ corresponding to the peak wavelength $\lambda p$ is also transmitted through the optical filter device 500, the light from these transmission wavelength bands $Rp_1$ is distant from the peak wavelength $\lambda p$, and is sufficiently smaller in the light intensity than the light in the transmission wavelength band $Rp_0$. Therefore, the light intensity of the light having been transmitted through these transmission wavelength bands $Rp_1$ does not affect the measurement accuracy.

Configuration of Detector, I-V Converter, Amplifier, and A/D Converter of Optical Module Then, going back to FIG. 1, the optical module 10 will be explained.

The detector 11 receives (detects) the light having been transmitted through the optical filter device 500, and then outputs a detection signal based on the received light intensity to the I-V converter 12.

The I-V converter 12 converts the detection signal input from the detector 11 into a voltage value, and then outputs the voltage value to the amplifier 13.

The amplifier 13 amplifies the voltage (the detected voltage), which is input from the I-V converter 12, and corresponds to the detection signal.

The A/D converter 14 converts the detected voltage (an analog signal) input from the amplifier 13 into a digital signal, and then outputs the digital signal to the control section 20.

The drive control section 15 applies a drive voltage to the electrostatic actuator 56 of the optical filter device 500 based on the control by the control section 20. Thus, the electrostatic attractive force is generated between the stationary electrode 561 and the movable electrode 562 of the electrostatic actuator 56, and the movable section 521 is displaced toward the stationary substrate 51.

Configuration of Control Section

Then the control section 20 of the spectroscopic measurement device 1 will be explained.

The control section 20 is configured by combining, for example, a CPU and a memory with each other, and controls an overall operation of the spectroscopic measurement device 1. As shown in FIG. 1, the control section 20 is provided with a wavelength setting section 21, a light intensity acquisition section 22, and a spectroscopic measurement section 23. Further, a memory of the control section 20 stores V-$\lambda$, data representing a relationship between the wavelength of the light to be transmitted through the optical filter device 500 and the drive voltage to be applied to the electrostatic actuator 56 in accordance with the wavelength.

The wavelength setting section 21 sets the target wavelength of the light to be taken out by the optical filter device 500, and then outputs an instruction signal, which instructs to apply the drive voltage corresponding to the target wavelength thus set to the electrostatic actuator 56, to the drive control section 15 based on the V-$\lambda$, data.

The light intensity acquisition section 22 obtains the light intensity of the light with the target wavelength transmitted through the optical filter device 500 based on the light intensity obtained by the detector 11.

The spectroscopic measurement section 23 measures the spectrum characteristics of the measurement target light based on the light intensity obtained by the light intensity acquisition section 22.

Measurement Process in Spectroscopic Measurement Device

Then, a spectroscopic measurement process using the spectroscopic measurement device 1 according to the present embodiment will be explained based on the drawings.

In the present embodiment, the measurement light from the measurement object X enters the bandpass filter 502 before entering the variable wavelength interference filter 501. Therefore, the measurement light enters the variable wavelength interference filter 501 in the state in which the light with the wavelength in the non-transmission wavelength bands Rn out of the measurement light is cut.

Further, in the spectroscopic measurement process, the wavelength setting section 21 sequentially reads out the drive voltages corresponding to the predetermined measurement wavelengths in the measurement target wavelength band from the V-λ data stored in the memory, and then outputs instruction signals of applying the drive voltages to the electrostatic actuator 56 to the drive control section 15.

Here, the drive voltages sequentially read out by the wavelength setting section 21 are, for example, drive voltages for obtaining the light intensity in the measurement target wavelength band at intervals of 20 nm. For example, the drive voltage in the case of setting the peak wavelength λp to 700 nm, the drive voltage in the case of setting the peak wavelength λp to 680 nm, . . . , and the drive voltage in the case of setting the peak wavelength λp to 400 nm are sequentially read out. Thus, the peak wavelength λp of the light output from the variable wavelength interference filter 501 varies by a pitch of 20 nm, namely by a distance between the center wavelengths of the transmission wavelength bands Rp of the bandpass filter 502.

On this occasion, as described above, the light in the non-transmission wavelength bands Rn is cut by the bandpass filter 502. Therefore, the light intensity of the light with the wavelength in these non-transmission wavelength bands Rn in the light emitted from the optical filter device 500 is sufficiently small.

In contrast, in the light emitted from the variable wavelength interference filter 501, since the light with the half bandwidth A centered on the peak wavelength λp is output, the light intensity of the rest of the transmission wavelength bands $Rp_1$ becomes sufficiently low with respect to the light intensity of the light in the transmission wavelength band $Rp_0$ corresponding to the peak wavelength λp. Therefore, the light transmitted through the optical filter device 500 becomes to have the light in the bandwidth of the transmission wavelength band $Rp_0$ centered on the peak wavelength λp as a principal component, and thus, it results that the detector 11 detects the light emitted with high resolution.

Subsequently, the light intensity acquisition section 22 of the control section 20 obtains the light intensity of the light received by the detector 11 as the measurement light intensity, and then stores the measurement light intensity in the storage device such as a memory, and the spectroscopic measurement section 23 calculates the dispersion spectrum with respect to the measurement object X based on the light intensity corresponding to each of the wavelengths thus obtained.

Functions and Advantages of First Embodiment

In the present embodiment, the optical filter device 500 is provided with the variable wavelength interference filter 501 and the bandpass filter 502. Further, the bandpass filter 502 has spectral characteristics having a plurality of transmission wavelength bands Rp corresponding to the target wavelengths (the peak wavelengths) to be measured by the spectroscopic measurement device 1.

In such a configuration, by controlling the drive voltage of the electrostatic actuator 56 so that the light with the peak wavelength λp corresponding to the gap G1 is included in the transmission wavelength band $Rp_0$ of the bandpass filter 502, the light in the transmission wavelength band $Rp_0$ including the peak wavelength λp is transmitted through the optical filter device 500 and then received by the detector 11. In contrast, since the light in the non-transmission wavelength bands Rn is cut by the bandpass filter 502, the transmission light intensity is sufficiently reduced. Further, the light in the rest of the transmission wavelength bands $Rp_1$ not corresponding to the peak wavelength λp is sufficiently reduced in light intensity by the variable wavelength interference filter 501 to the extent that no influence is exerted on the measurement accuracy. As described above, in the optical filter device 500 according to the present embodiment, it is possible to accurately emit the light with the peak wavelength λp to thereby achieve the improvement in resolution.

Further, the optical module 10 is capable of detecting the light, which has been emitted by the optical filter device 500 with high resolution, using the detector 11, and can obtain an accurate measurement result. Therefore, it is possible for the spectroscopic measurement device 1 to perform the spectroscopic measurement of the measurement object X with accuracy based on the accurate measurement result.

In the present embodiment, the bandwidth of the transmission wavelength band Rp in the bandpass filter 502 is smaller than the half bandwidth A of the light transmitted through the variable wavelength interference filter 501. In the case in which the bandwidth of the transmission wavelength band Rp is larger than the half bandwidth A, it results that the light in a broad wavelength range centered on the peak wavelength λp is transmitted through the optical filter device 500, and in some cases, a sufficient improvement in resolution cannot be achieved. In contrast, the present embodiment is capable of making the light in a narrow range centered on the peak wavelength λp be transmitted through the optical filter device 500 using the configuration described above, and can therefore achieve the improvement in resolution compared to the case of setting the bandwidth of the transmission wavelength band Rp to be equal to or larger than the half bandwidth.

In the present embodiment, the bandwidth of the non-transmission wavelength band Rn is larger than a half of the half bandwidth A. Therefore, since increase in the light intensity of the light corresponding to the rest of the transmission wavelength bands $Rp_1$ other than the transmission wavelength band $Rp_0$ corresponding to the peak wavelength λp can be suppressed, a further improvement in resolution of the optical filter device 500 can be achieved.

In the present embodiment, the bandpass filter 502 is disposed on the light entrance side of the variable wavelength interference filter 501 in the optical filter device 500.

In the case in which the bandpass filter 502 is disposed on the light exit side of the variable wavelength interference filter 501, the light reflected by the bandpass filter 502 enters the variable wavelength interference filter 501 in some cases. In contrast, in the present embodiment, the light having been transmitted through the variable wavelength interference filter 501 is not reflected by the bandpass filter 502, but can be input to the detector 11 due to the configuration described above. Thus, the reduction of noise can be achieved.

In the present embodiment, the bandpass filter 502 is formed of the dielectric multilayer film. Such a dielectric multilayer film can easily be deposited using an evaporation method or a sputtering method, and the manufacturing efficiency can be improved.

In the present embodiment, the transmittance of the non-transmission wavelength bands Rn in the bandpass filter 502 is equal to or lower than 10%. Therefore, the light intensity of the light having an unwanted wavelength component transmitted through the non-transmission wavelength bands Rn can be suppressed, a further improvement in the optical filter device 500 can be achieved.

In the present embodiment, the bandpass filter 502 is formed on the stationary substrate 51 of the variable wavelength interference filter 501. Therefore, the variable wavelength interference filter 501 and the bandpass filter 502 can be integrated with each other, and thus, a thickness reduction of the optical filter device 500 can be achieved.

Second Embodiment

Then, a second embodiment of the invention will be explained based on the accompanying drawing.

Although in the above description of the first embodiment, there is described the example of disposing the single bandpass filter 502 in the optical filter device 500, the second embodiment is different from the first embodiment described above in the point that two or more bandpass filters 502 are disposed in the optical filter device.

Figure 7:
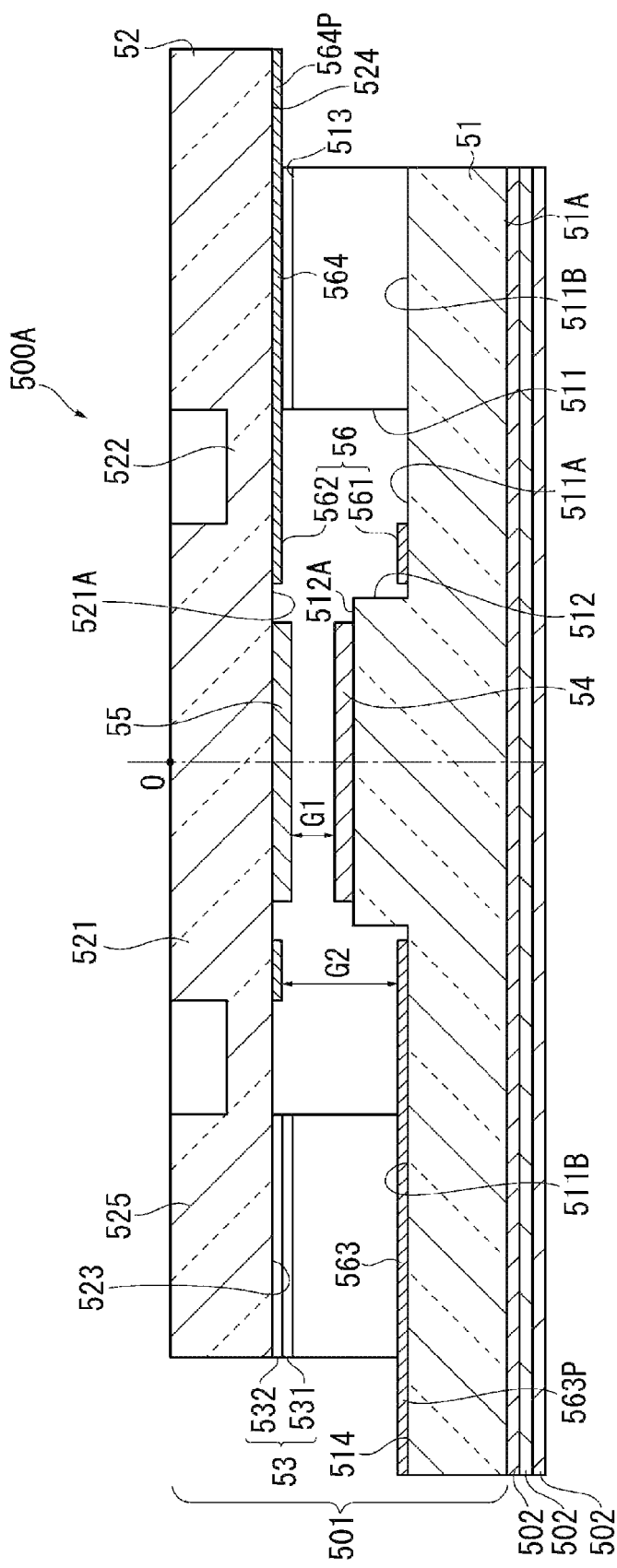
FIG. 7 is a cross-sectional view showing a schematic configuration of an optical filter device according to a second embodiment of the invention.

FIG. 7 is a diagram showing a schematic configuration of the optical filter device 500A in the present embodiment. It should be noted that in the following explanation of the embodiment, constituents identical to those of the first embodiment will be denoted by the same reference symbols, and the explanation thereof will be omitted or simplified.

As shown in FIG. 7, the optical filter device 500A according to the present embodiment is provided with the variable wavelength interference filter 501 and a plurality of bandpass filters 502 disposed on the stationary substrate 51 of the variable wavelength interference filter 501.

These bandpass filters 502 each have the same optical characteristics (transmission characteristics) as each other. In other words, there is provided a configuration having the plurality of (three in the example shown in FIG. 7) bandpass filters 502, each formed of such a dielectric multilayer film as shown in the description of the first embodiment, and stacked on the stationary substrate 51.

In the case of disposing the plurality of bandpass filters 502, there are obtained the transmission characteristics obtained by multiplying the transmittances of these bandpass filters 502 by each other. Specifically, in the case in which the transmittance in the non-transmission wavelength bands Rn is 10% in the bandpass filter 502, the transmittance of 0.1% is obtained by using three bandpass filters, and the light transmittance in the non-transmission wavelength bands Rn can be approximated to zero. Therefore, in the present embodiment, the light having the unwanted wavelength component in the non-transmission wavelength bands Rn can more surely be cut, and the resolution of the optical filter device 500A can further be improved.

Third Embodiment

Then, a third embodiment of the invention will be explained based on the accompanying drawing.

Figure 8:
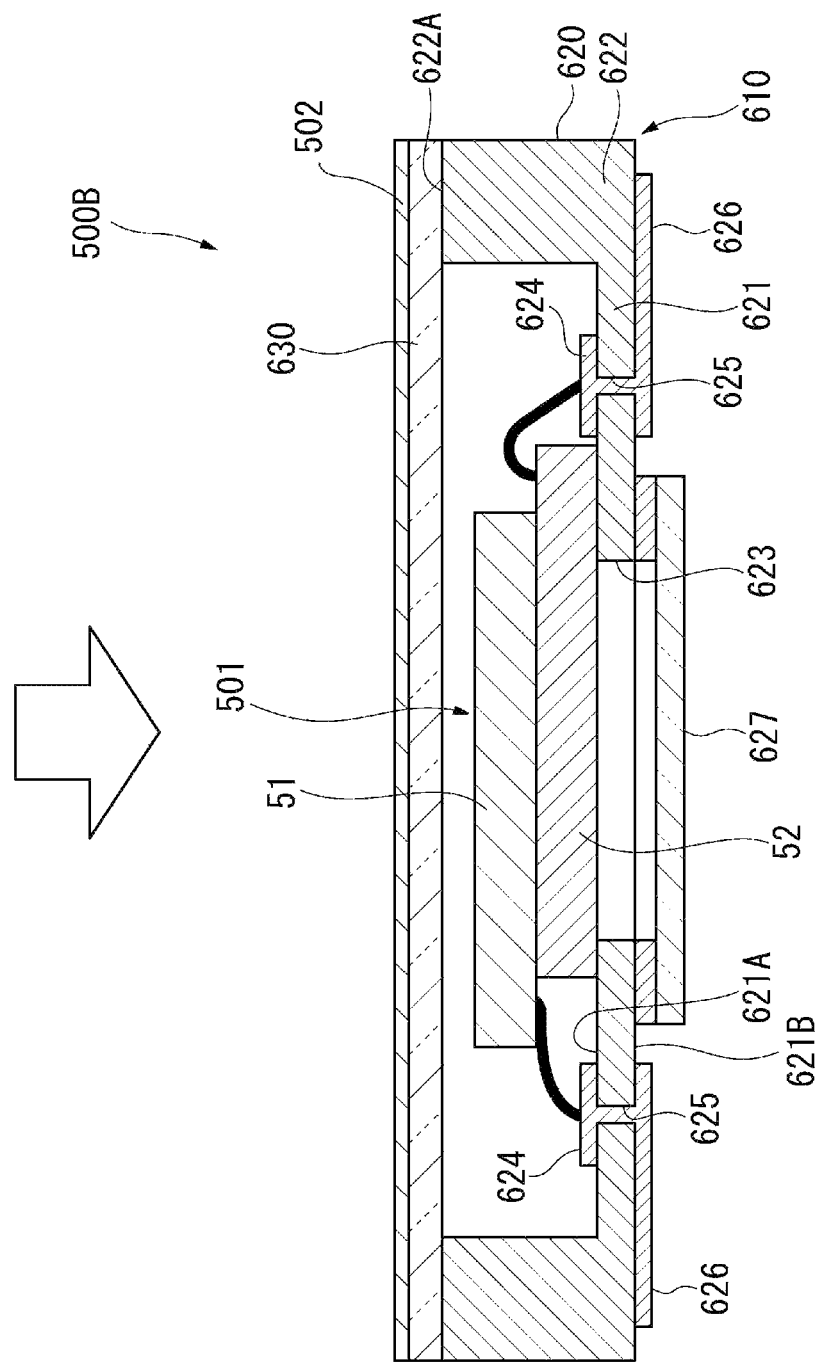
FIG. 8 is a cross-sectional view showing a schematic configuration of an optical filter device according to a third embodiment of the invention.

FIG. 8 is a cross-sectional view showing a schematic configuration of an optical filter device 500B according to the third embodiment of the invention.

As shown in FIG. 8, the optical filter device 500B is provided with a housing 610 including a base 620 and a lid 630. By bonding the base 620 and the lid 630 to each other, a housing space is formed inside, and the variable wavelength interference filter 501 is housed in the housing space.
Configuration of Base The base 620 is formed of, for example, ceramic. The base 620 is provided with a pedestal section 621 and a sidewall section 622.

The pedestal section 621 is formed to have a plate-like shape having, for example, a rectangular outer shape in the filter planar view, and the sidewall section 622 having a cylindrical shape stands in the circumferential portion of the pedestal section 621 towards the lid 630.

The pedestal section 621 is provided with an opening 623 penetrating in the thickness direction. The opening 623 is disposed so as to include the region overlapping the reflecting films 54, 55 in a planar view of viewing the pedestal section 621 in the thickness direction in the state in which the variable wavelength interference filter 501 is housed in the pedestal section 621.

Further, a glass member 627 for covering the opening 623 is bonded to a surface (a base outer surface 621B) of the pedestal 621 on an opposite side to the lid 630. As the bonding method of bonding the pedestal section 621 and the glass member 627, there can be used, for example, low-melting-point glass bonding using a glass frit (low-melting-point glass), which is a scrap of glass obtained by melting a glass material at high temperature and then rapidly cooling it, or bonding with epoxy resin. In the present embodiment, the housing space is airtightly maintained in the state of keeping the reduced pressure. Therefore, it is preferable for the pedestal section 621 and the glass member 627 to be bonded to each other using the low-melting-point glass bonding.

Further, an inner surface (abase inner surface 621A) of the pedestal section 621 opposed to the lid 630 is provided with internal terminal sections 624 to be connected to the respective electrode pads 563P, 564P of the variable wavelength interference filter 501. The internal terminal sections 624 and the respective electrode pads 563P, 564P are connected to each other with, for example, flexible printed circuits (FPC).

Further, the pedestal section 621 is provided with through holes 625 formed at positions where the internal terminal sections 624 are disposed. The internal terminal sections 624 are connected to external terminal sections 626 disposed on the base outer surface 621B of the pedestal section 621 via the through holes 625.

The sidewall section 622 stands from the edge portion of the pedestal section 621, and surrounds the periphery of the variable wavelength interference filter 501 mounted on the base inner surface 621A. The surface (an end surface 622A) of the sidewall section 622 opposed to the lid 630 is a flat surface parallel to, for example, the base inner surface 621A.

Further, the variable wavelength interference filter 501 is fixed to the base 620 using the fixation member such as an adhesive. On this occasion, the variable wavelength interference filter 501 can be fixed to the pedestal section 621, or can also be fixed to the sidewall section 622. Although the fixation member can be disposed at a plurality of places, it is preferable to fix the variable wavelength interference filter 501 at one place in order to inhibit the stress of the fixation member from being transmitted to the variable wavelength interference filter 501.
Configuration of Lid The lid 630 has a rectangular outer shape in the planar view, and constitutes a light transmissive member according to the invention. The lid is formed of, for example, glass.

As shown in FIG. 8, the lid 630 is bonded to the sidewall section 622 of the base 620. As the bonding method, for example, bonding with the low-melting-point glass can be cited.

Further, in the optical filter device 500B of the present embodiment, the bandpass filter 502 is provided to the lid 630. It should be noted that although in FIG. 8, there is shown an example of disposing the bandpass filter 502 on an outer surface (on the opposite side to the base 620) of the lid 630, the invention is not limited thereto, but there can also be adopted a configuration in which, for example, the bandpass filter 502 is disposed on an inner surface (on the base 620 side) of the lid 630.

Further, there can also be adopted a configuration of providing a plurality of bandpass filters 502 as in the case of the second embodiment.

Functions and Advantages of Third Embodiment

In the optical filter device 500B according to the present embodiment described above, since the variable wavelength interference filter 501 is protected by the housing 610, breakage of the variable wavelength interference filter 501 due to an external factor can be prevented. Further, since an electrically-charged particle or the like can be inhibited from invading the inside of the housing 610, a problem that the gap dimension between the reflecting films 54, 55 varies due to adhesion of the electrically-charged particle to the reflecting films 54, 55 or generation of a Coulomb force due to the electrically-charged particle can be inhibited.

Further, as in the case of the embodiment described above, the bandpass filter 502 is provided to the lid 630 of the housing 610. In such a configuration, the variable wavelength interference filter (the variable wavelength interference filter without the bandpass filter 502 disposed on the stationary substrate 51) having been used in the past, for example, can be housed in the housing 610 without modification, and thus, the versatility can be enhanced.

It should be noted that although in the present embodiment, it is assumed to adopt the configuration in which the bandpass filter 502 is not directly disposed on the variable wavelength interference filter 501 housed inside the housing 610, the invention is not limited thereto. For example, it is also possible to adopt a configuration in which, for example, the bandpass filter 502 is not provided to the lid 630, but is directly disposed on the variable wavelength interference filter 501 as in the case of the first embodiment or the second embodiment described above. Further, there can also be adopted a configuration of, for example, providing a plurality of bandpass filters 502 to the lid 630 as in the case of the second embodiment. Further, it is also possible to adopt a configuration in which the bandpass filter 502 is disposed on the variable wavelength interference filter 501 as in the case of the first embodiment and the second embodiment, and further the bandpass filter 502 having the same optical characteristics is also provided to the lid 630. In this case, the transmittance with respect to the non-transmission wavelength bands Rn can further be reduced similarly to the second embodiment.

Other Embodiments

It should be noted that the invention is not limited to the embodiments described above, but includes modifications, improvements, and so on within a range where the advantages of the invention can be achieved.

Although in the embodiments described above, the metal film and the alloy film having the broad measurable wavelength band are described as an example of the reflecting films 54, 55, it is also possible to use, for example, a dielectric multilayer film as described above.

Although in the embodiments described above, the half bandwidth of the light having been transmitted through the variable wavelength interference filter 501 is roughly constant, and the optical characteristics of the bandpass filter are explained based on the half bandwidth A as the average value thereof, the invention is not limited to this configuration.

As described above, the light having been transmitted through the variable wavelength interference filter 501 varies in half bandwidth with the wavelength. Therefore, it is also possible to set the transmission wavelength bands Rp and the non-transmission wavelength bands Rn of the bandpass filter 502 with respect to each of the wavelengths to be the measurement target. For example, in the case in which the half bandwidth becomes 30 nm when the light having the wavelength of 520 nm is transmitted in the variable wavelength interference filter 501, and the half bandwidth becomes 40 nm when the light having the wavelength of 400 nm is transmitted, the optical characteristics of the bandpass filter 502 can also be set as follows. Specifically, the transmission wavelength band $Rp_{520}$ centered on the wavelength of 520 nm of the bandpass filter 502 is set to 3 nm, and the bandwidth of the non-transmission wavelength band Rn adjacent to the transmission wavelength band $Rp_{520}$ is set to 16 nm larger than a half (15 nm) of the half bandwidth of 30 nm. In contrast, the transmission wavelength band $Rp_{400}$ centered on the wavelength of 400 nm of the bandpass filter 502 is set to 4 nm, and the bandwidth of the non-transmission wavelength band Rn adjacent to the transmission wavelength band $Rp_{400}$ is set to 22 nm larger than a half (20 nm) of the half bandwidth of 40 nm.

As described above, by setting the optical characteristics of the bandpass filter 502 based on the half bandwidth of each of the measurement target wavelengths to be transmitted through the variable wavelength interference filter 501, it becomes possible to make the optical filter devices 500, 500A, and 500B emit the light with higher resolution.

Although in the above description of the embodiments, there is described the example in which the bandwidth of the transmission wavelength band in the bandpass filter 502 is smaller than the half bandwidth of the light emitted from the variable wavelength interference filter 501, the invention is not limited thereto. In the case in which the half bandwidth of the light to be emitted from the variable wavelength interference filter is small such as a case of using the dielectric multilayer film as the reflecting film, it is also possible to make the bandwidth of the transmission wavelength band larger than the half bandwidth to the extent that the measurement accuracy is not affected. It should be noted that in this case, since the light with the unwanted wavelength component increases, it is preferable to set the bandwidth to be equal to or smaller than the half bandwidth.

Further, although in the above description of the embodiments, there is described the example in which the bandwidth of the non-transmission wavelength band in the bandpass filter 502 is set to be equal to or larger than a half of the half bandwidth, the invention is not limited to this example. It is also possible to set the bandwidth of the non-transmission wavelength band to be smaller than a half of the half bandwidth depending on the acquisition intervals of the wavelengths thus obtained such as the case in which, for example, a detailed colorimetric process is performed. It should be noted that since the intensity of the light including the unwanted light component increases among the light having been transmitted through the variable wavelength interference filter, it is preferable to set the bandwidth to be equal to or larger than a half of the half bandwidth.

Although in the embodiments described above, there is adopted the configuration of disposing the bandpass filter 502 on the light entrance side of the variable wavelength interference filter 501, the invention is not limited to this configuration. It is also possible to adopt a configuration of, for example, disposing the bandpass filter 502 on the light exit side of the variable wavelength interference filter 501.

Although in the above description of the embodiments, there is described the example in which the bandpass filter 502 is formed of the dielectric multilayer film, the invention is not limited to this example. It is also possible to adopt a configuration in which, for example, a plurality of transmission wavelength bands are set by combining a plurality of types of single-layer cut filters with each other as the bandpass filter 502.

Although there is described the example in which the transmittance in the non-transmission wavelength bands is equal to or lower than 10% in the bandpass filter 502, the invention is not limited to this example. For example, as described in the description of the second embodiment, by adopting the configuration of combining the plurality of bandpass filters with each other, the transmittance of the non-transmission wavelength bands with respect to the non-transmission wavelength bands of the optical filter device can be reduced. In such a case, the transmittance in the non-transmission wavelength bands in each of the bandpass filters 502 can also be higher than 10%. For example, even in the case in which the transmittance in the non-transmission wavelength bands is 20%, by combining two bandpass filters with each other, the transmittance in the non-transmission wavelength bands can be reduced to 4%.

In the above description of the first and second embodiments, there is described the example of integrally forming the variable wavelength interference filter 501 and the bandpass filter 502 with each other. Further, in the description of the third embodiment, there is described the configuration of providing the bandpass filter 502 to the lid 630 of the housing 610. In contrast, it is also possible to adopt a configuration of providing the bandpass filter separately from the variable wavelength interference filter or the housing.

Although in the above description of the embodiments, the electrostatic actuator 56 is described as an example of the gap changing section, the invention is not limited to this example. As the gap changing section, there can also be adopted a configuration in which, for example, a piezoelectric actuator is expanded or contracted by controlling the applied voltage to the piezoelectric actuator to thereby change the gap between the reflecting films. Further, besides the above, an actuator using air pressure, a configuration of using a inductive coil and a magnet and changing the gap between the reflecting films using a magnetic force, and so on can be cited as an example.

Although the spectroscopic measurement device 1 is cited in each of the embodiments described above as an example of the electronic apparatus according to the invention, the optical filter device, the optical module, and the electronic apparatus according to the invention can be applied in a variety of fields besides the above.

For example, the invention can also be used for an inspection device of the light source for emitting light with plural types of wavelengths.

Figure 9:
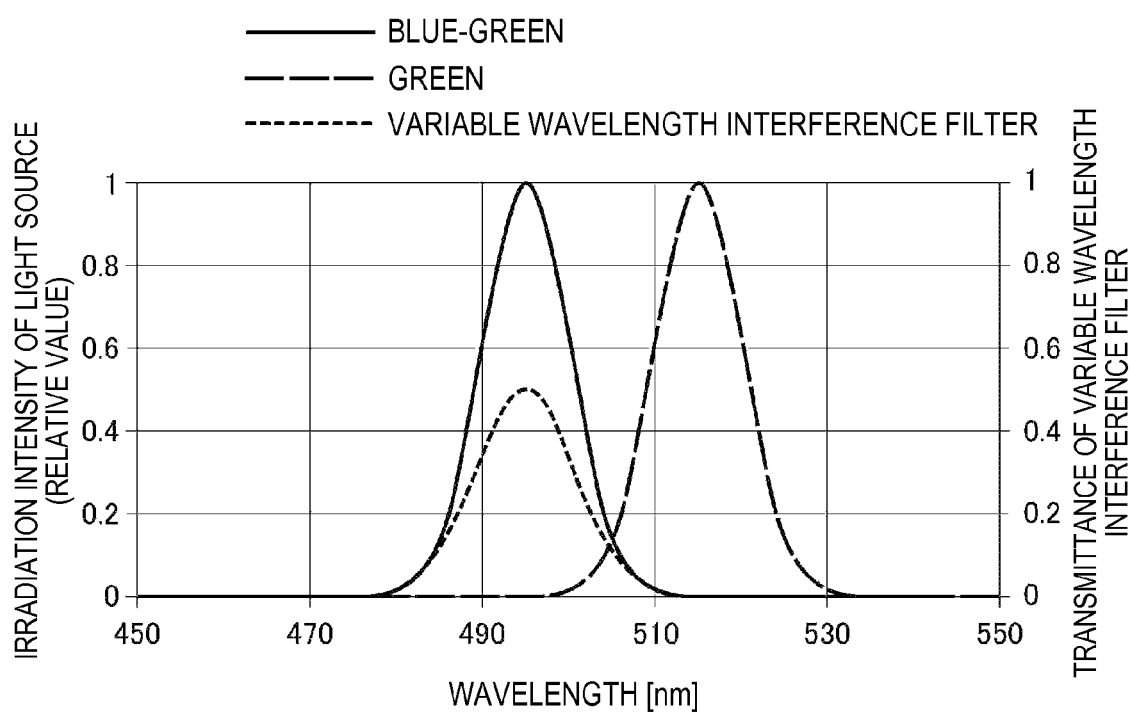
FIG. 9 is a diagram showing irradiation intensity characteristics of a light source and optical characteristics of a variable wavelength interference filter in a light source inspection device as another embodiment of the invention.
Figure 10:
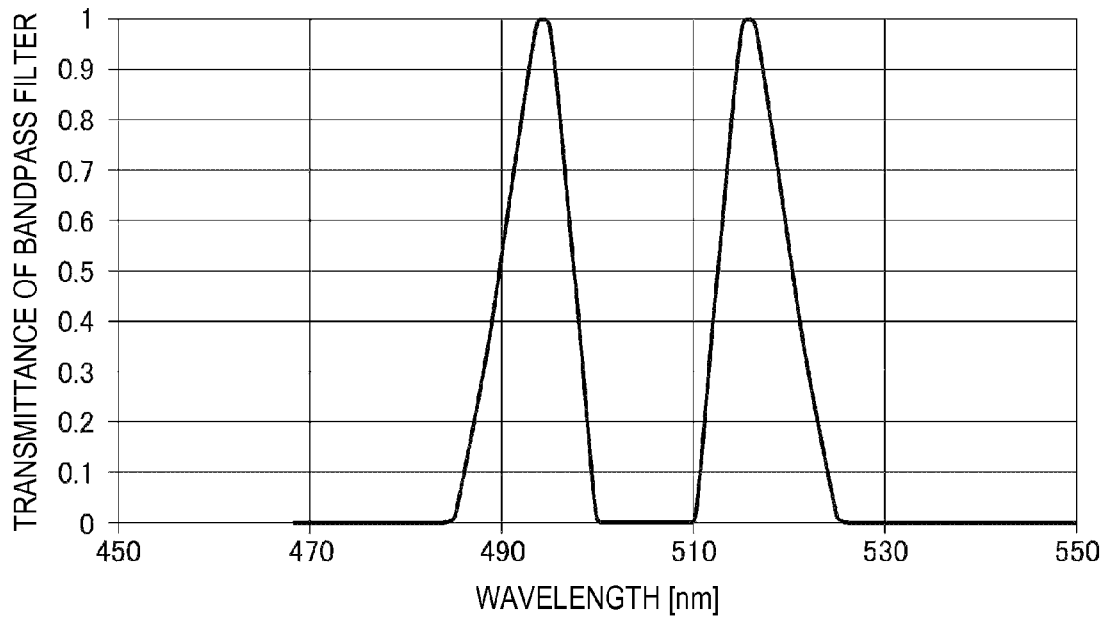
FIG. 10 is a diagram showing optical characteristics of a bandpass filter in the light source inspection device.
Figure 11:
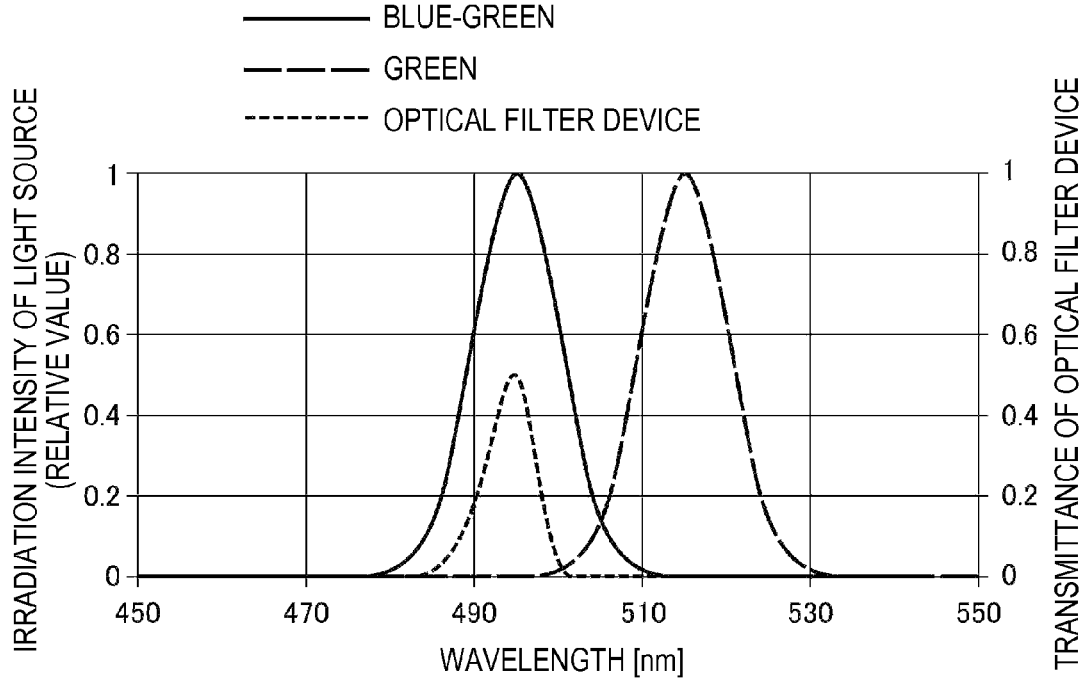
FIG. 11 is a diagram showing the irradiation intensity characteristics of the light source and optical characteristics of an optical filter device in the light source inspection device.

FIG. 9 is a diagram showing the irradiation intensity characteristics of the light source and the optical characteristics of the variable wavelength interference filter in the light source inspection device. FIG. 10 is a diagram showing the optical characteristics of the bandpass filter of the light source inspection device. FIG. 11 is a diagram showing the irradiation intensity characteristics of the light source and the optical characteristics ((optical characteristics of the variable wavelength interference filter)×(optical characteristics of the bandpass filter)) of the optical filter device in the light source inspection device.

As shown in FIG. 9, in the example, a first light source for emitting blue-green light (having the wavelength of 480 nm through 510 nm) and a second light source for emitting green light (having the wavelength of 500 nm through 530 nm) are used as the light source device. Then, the light source inspection device checks whether or not the light is appropriately emitted from each of the first light source and the second light source.

In such a case, if the variable wavelength interference filter is used alone, when checking the light from one light source (e.g., the first light source), the light from the other light source is also emitted partially from the variable wavelength interference filter as shown in FIG. 9, and therefore, it is unachievable to check the accurate light intensity.

In contrast, there is used the optical filter device having the bandpass filter shown in FIG. 10 and the variable wavelength interference filter combined with each other. Thus, as shown in FIG. 11, it becomes that when checking the light from one light source, the light from the other light source is hardly detected in the light emitted from the optical filter device. Therefore, it becomes possible to accurately check whether or not the light is appropriately emitted from each of the light sources.

Figure 12:
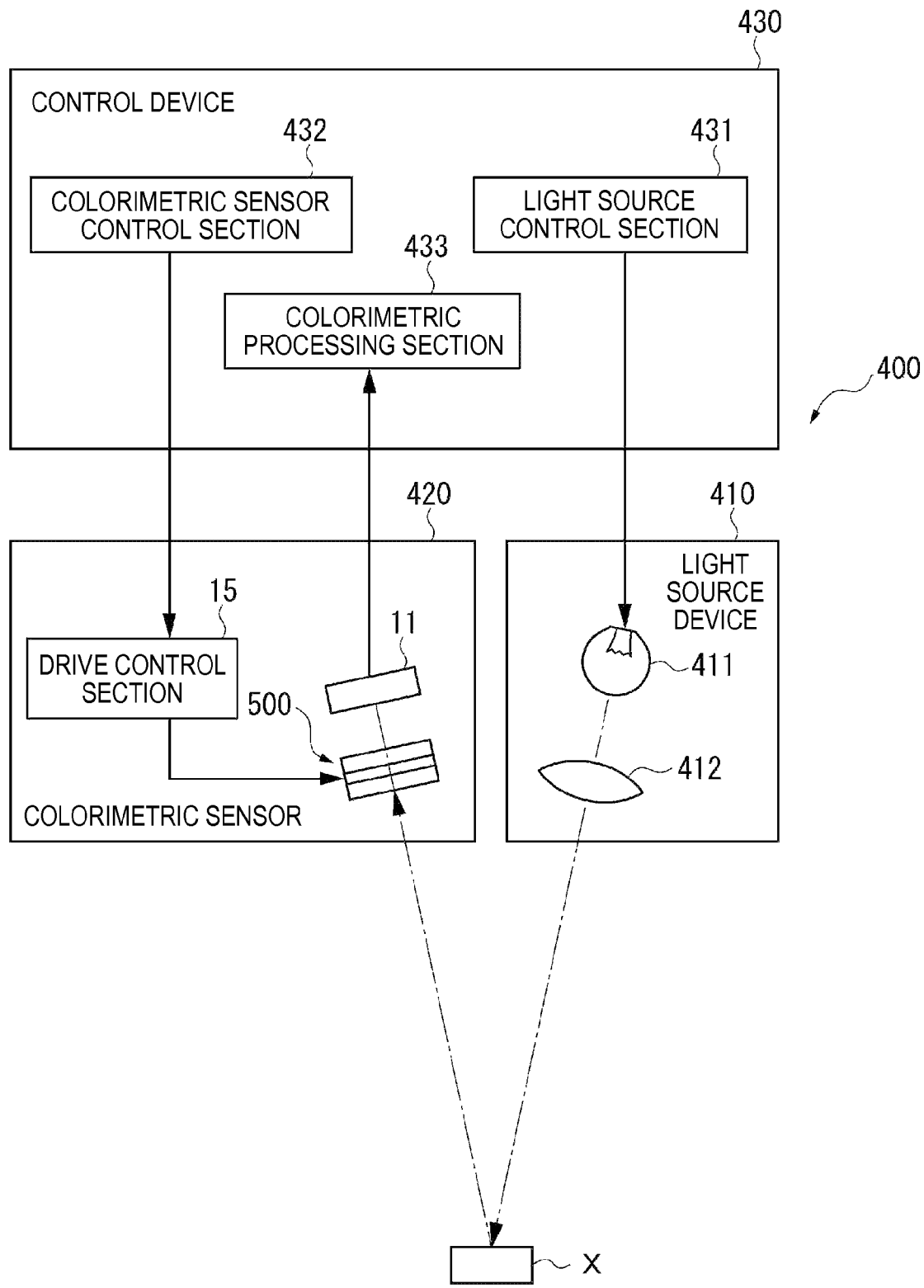
FIG. 12 is a block diagram showing a schematic configuration of a colorimetric device as another example of an electronic apparatus according to the invention.

Further, for example, as shown in FIG. 12, it is also possible to apply the electronic apparatus according to the invention to a colorimetric device for measuring colors.

FIG. 12 is a block diagram showing an example of the colorimetric device 400 equipped with the optical filter device 500.

As shown in FIG. 12, the colorimetric device 400 is provided with a light source device 410 for emitting light to the measurement object X, a colorimetric sensor 420 (an optical module), and a control device 430 for controlling an overall operation of the colorimetric device 400. Further, the colorimetric device 400 is a device for making the light, which is emitted from the light source device 410, be reflected by the measurement object X, receiving the test target light thus reflected using the colorimetric sensor 420, and analyzing and then measuring the chromaticity of the test target light, namely the color of the measurement object X, based on the detection signal output from the colorimetric sensor 420.

The light source device 410 is provided with a light source 411 and a plurality of lenses 412 (one of the lenses is shown alone in FIG. 12), and emits, for example, reference light (e.g., white light) to the measurement object X. Further, it is possible for the plurality of lenses 412 to include a collimator lens, and in this case, the light source device 410 converts the reference light emitted from the light source 411 into parallel light with the collimator lens, and then emits it from the projection lens not shown toward the measurement object X. It should be noted that although in the present embodiment, the colorimetric device 400 provided with the light source device 410 is described as an example, in the case in which, for example, the measurement object X is a light emitting member such as a liquid crystal panel, it is also possible to adopt a configuration not provided with the light source device 410.

The colorimetric sensor 420 is the optical module according to the invention, and is provided with the optical filter device 500, the detector 11 for receiving the light transmitted through the optical filter device 500, and the drive control section 15 for varying the wavelength of the light to be transmitted through the optical filter device 500 as shown in FIG. 12. Further, the colorimetric sensor 420 is provided with an incident optical lens not shown disposed at a position opposed to the optical filter device 500, the incident optical lens guiding the reflected light (the test target light), which has been reflected by the measurement object X, into the inside thereof. Further, the colorimetric sensor 420 disperses the light with a predetermined wavelength out of the test target light input from the incident optical lens using the optical filter device 500, and then receives the light thus dispersed using the detector 11. It should be noted that it is also possible to adopt a configuration in which the optical filter device 500A, 500B is disposed instead of the optical filter device 500.

The control device 430 controls an overall operation of the colorimetric device 400.

As the control device 430, a general-purpose personal computer, a handheld terminal, a colorimetry-dedicated computer, and so on can be used. Further, as shown in FIG. 12, the control device 430 is configured including a light source control section 431, a colorimetric sensor control section 432, a colorimetric processing section 433, and so on.

The light source control section 431 is connected to the light source device 410, and outputs a predetermined control signal to the light source device 410 based on, for example, a setting input by the user to thereby make the light source device 410 emit white light with a predetermined brightness.

The colorimetric sensor control section 432 is connected to the colorimetric sensor 420, and sets the wavelength of the light to be received by the colorimetric sensor 420 based on, for example, the setting input by the user, and then outputs the control signal instructing to detect the intensity of the received light with the set wavelength to the colorimetric sensor 420. Thus, the drive control section 15 of the colorimetric sensor 420 applies the voltage to the electrostatic actuator 56 based on the control signal to thereby drive the optical filter device 500.

The colorimetric processing section 433 analyzes the chromaticity of the measurement object X based on the received light intensity detected by the detector 11.

Further, as another example of the electronic apparatus according to the invention, there can be cited an optical-base system for detecting presence of a specific material. As an example of such a system, there can be cited an in-car gas leak detector adopting a spectroscopic measurement method using the optical module according to the invention to detect a specific gas with high sensitivity, and a gas detection device such as an optoacoustic noble-gas detector for a breath test.

An example of such a gas detection device will hereinafter be explained based on the accompanying drawings.

Figure 13:
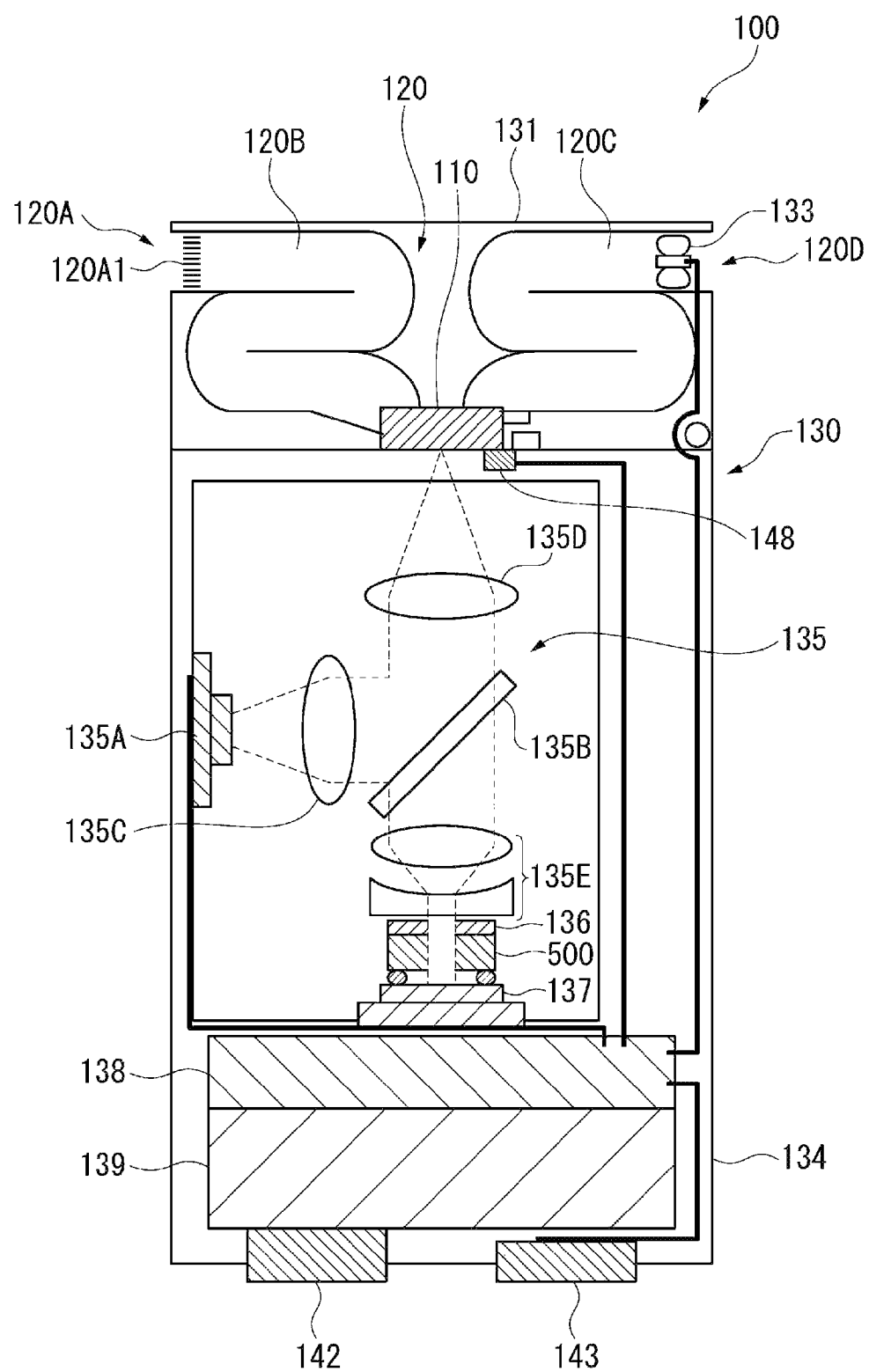
FIG. 13 is a schematic diagram of a gas detection device as another example of the electronic apparatus according to the invention.

FIG. 13 is a schematic diagram showing an example of a gas detection device equipped with the optical filter device according to the invention.

Figure 14:
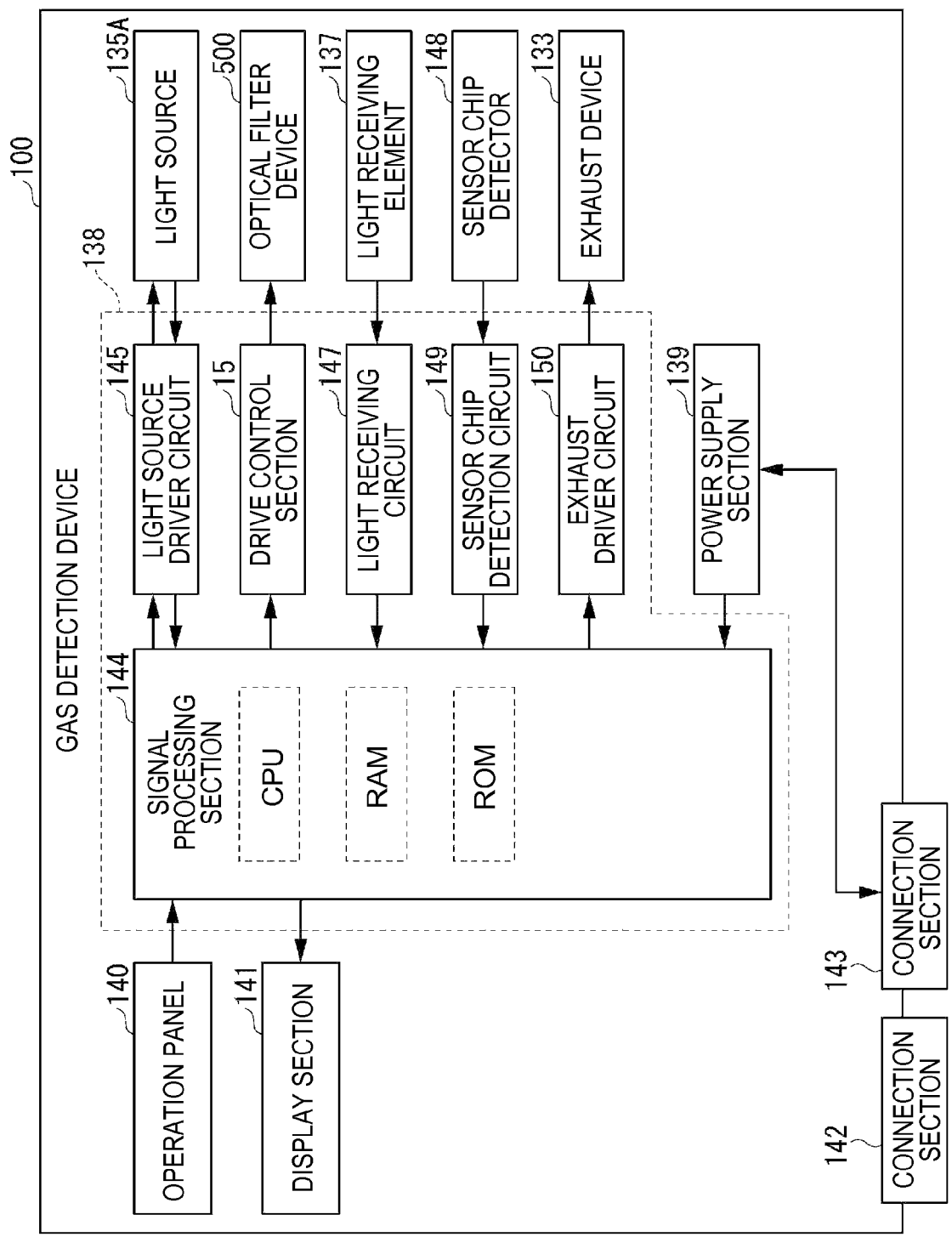
FIG. 14 is a block diagram showing a control system of the gas detection device shown in FIG. 13.

FIG. 14 is a block diagram showing a configuration of a control system of the gas detection device shown in FIG. 13.

As shown in FIG. 13, the gas detection device 100 is configured including a sensor chip 110, a channel 120 provided with a suction port 120A, a suction channel 120B, an exhaust channel 120C, and an exhaust port 120D, and a main body section 130.

The main body section 130 is constituted by a detection device (an optical module) including a sensor section cover 131 having an opening to which the channel 120 is detachably attached, an exhaust device 133, a housing 134, an optical section 135, a filter 136, the optical filter device 500, a light receiving element 137 (a light receiving section), and so on, a control section 138 (a processing section) for performing processing of the signal output in accordance with the light received by the light receiving element 137 and control of the detection device and the light source section, a power supply section 139 for supplying electrical power, and so on. It should be noted that it is also possible to adopt a configuration in which the optical filter device 500A, 500B is disposed instead of the optical filter device 500. Further, the optical section 135 includes a light source 135A for emitting light, a beam splitter 135B for reflecting the light, which is input from the light source 135A, toward the sensor chip 110, and transmitting the light, which is input from the sensor chip side, toward the light receiving element 137, and lenses 135C, 135D, and 135E.

Further, as shown in FIG. 14, on the surface of the gas detection device 100, there are disposed an operation panel 140, a display section 141, a connection section 142 for an interface with an external device, and the power supply section 139. In the case in which the power supply section 139 is a secondary battery, a connection section 143 for the battery charge can also be provided.

Further, as shown in FIG. 14, the control section 138 of the gas detection device 100 is provided with a signal processing section 144 formed of a CPU and so on, a light source driver circuit 145 for controlling the light source 135A, the drive control section 15 for controlling the optical filter device 500, a light receiving circuit 147 for receiving the signal from the light receiving element 137, a sensor chip detection circuit 149 for receiving the signal from a sensor chip detector 148 for reading a code of the sensor chip 110 to thereby detect presence or absence of the sensor chip 110, an exhaust driver circuit 150 for controlling the exhaust device 133, and so on.

Then, an operation of such a gas detection device 100 as described above will hereinafter be explained.

The sensor chip detector 148 is disposed inside the sensor section cover 131 in the upper part of the main body section 130, and the sensor chip detector 148 detects the presence or absence of the sensor chip 110. When detecting the detection signal from the sensor chip detector 148, the signal processing section 144 determines that it is the condition in which the sensor chip 110 is attached, and outputs a display signal for displaying the fact that the detection operation can be performed to the display section 141.

Then, in the case in which, for example, the user operates the operation panel 140, and the operation panel 140 outputs an instruction signal indicating that the detection process will be started to the signal processing section 144, the signal processing section 144 firstly outputs the signal for operating the light source to the light source driver circuit 145 to thereby operate the light source 135A. When the light source 135A is driven, the light source 135A emits a stable laser beam, which has a single wavelength and is a linearly polarized light. Further, the light source 135A incorporates a temperature sensor and a light intensity sensor, and the information of the sensors is output to the signal processing section 144. Then, in the case in which the signal processing section 144 determines that the light source 135A is operating stably based on the information of the temperature and the light intensity input from the light source 135A, the signal processing section 144 controls the exhaust driver circuit 150 to operate the exhaust device 133. Thus, the gaseous sample including the target material (the gas molecule) to be detected is guided from the suction port 120A to the suction channel 120B, the inside of the sensor chip 110, the exhaust channel 120C, and the exhaust port 120D. It should be noted that the suction port 120A is provided with a dust filter 120A1, and relatively large dust, some water vapor, and so on are removed.

Further, the sensor chip 110 is a sensor incorporating a plurality of sets of metal nano-structures, and using localized surface plasmon resonance. In such a sensor chip 110, an enhanced electric field is formed between the metal nano-structures due to the laser beam, and when the gas molecules enter the enhanced electric field, the Raman scattered light including the information of the molecular vibration, and the Rayleigh scattered light are generated.

The Rayleigh scattered light and the Raman scattered light pass through the optical section 135 and then enter the filter 136, and the Rayleigh scattered light is separated by the filter 136, and the Raman scattered light enters the optical filter device 500. Then, the signal processing section 144 outputs a control signal to the drive control section 15. Thus, the drive control section 15 drives the electrostatic actuator 56 of the optical filter device 500 in a similar manner to the first embodiment described above to make the optical filter device 500 disperse the Raman scattered light corresponding to the gas molecules to be the detection target. Subsequently, when the light thus dispersed is received by the light receiving element 137, a light reception signal corresponding to the received light intensity is output to the signal processing section 144 via the light receiving circuit 147. In this case, the Raman scattered light to be the target can accurately be taken out from the optical filter device 500.

The signal processing section 144 compares the spectrum data of the Raman scattered light corresponding to the gas molecule to be the detection target obtained in such a manner as described above and the data stored in the ROM with each other to thereby determine whether or not the gas molecule is the target one, and thus identifies the substance. Further, the signal processing section 144 makes the display section 141 display the result information, or outputs the result information from the connection section 142 to an external device.

It should be noted that although in FIGS. 13 and 14, there is exemplified the gas detection device 100 for dispersing the Raman scattered light with the optical filter device 500, and performing the gas detection based on the Raman scattered light thus dispersed, a gas detection device for identifying the gas type by detecting the absorbance unique to the gas can also be used. In this case, the gas sensor, which makes the gas flow into the sensor, and detects the light absorbed by the gas out of the incident light, is used as the optical module according to the invention. Further, the gas detection device for analyzing and determining the gas flowing into the sensor using such a gas sensor is cited as the electronic apparatus according to the invention. According also to such a configuration, it is possible to detect the component of the gas using the variable wavelength interference filter.

Further, as the system for detecting the presence of the specific substance, besides the gas detection described above, there can be cited a substance component analysis device such as a non-invasive measurement device of a sugar group using near-infrared dispersion, and a non-invasive measurement device of information of food, biological object, or mineral.

Hereinafter, a food analysis device will be explained as an example of the substance component analysis device described above.

Figure 15:
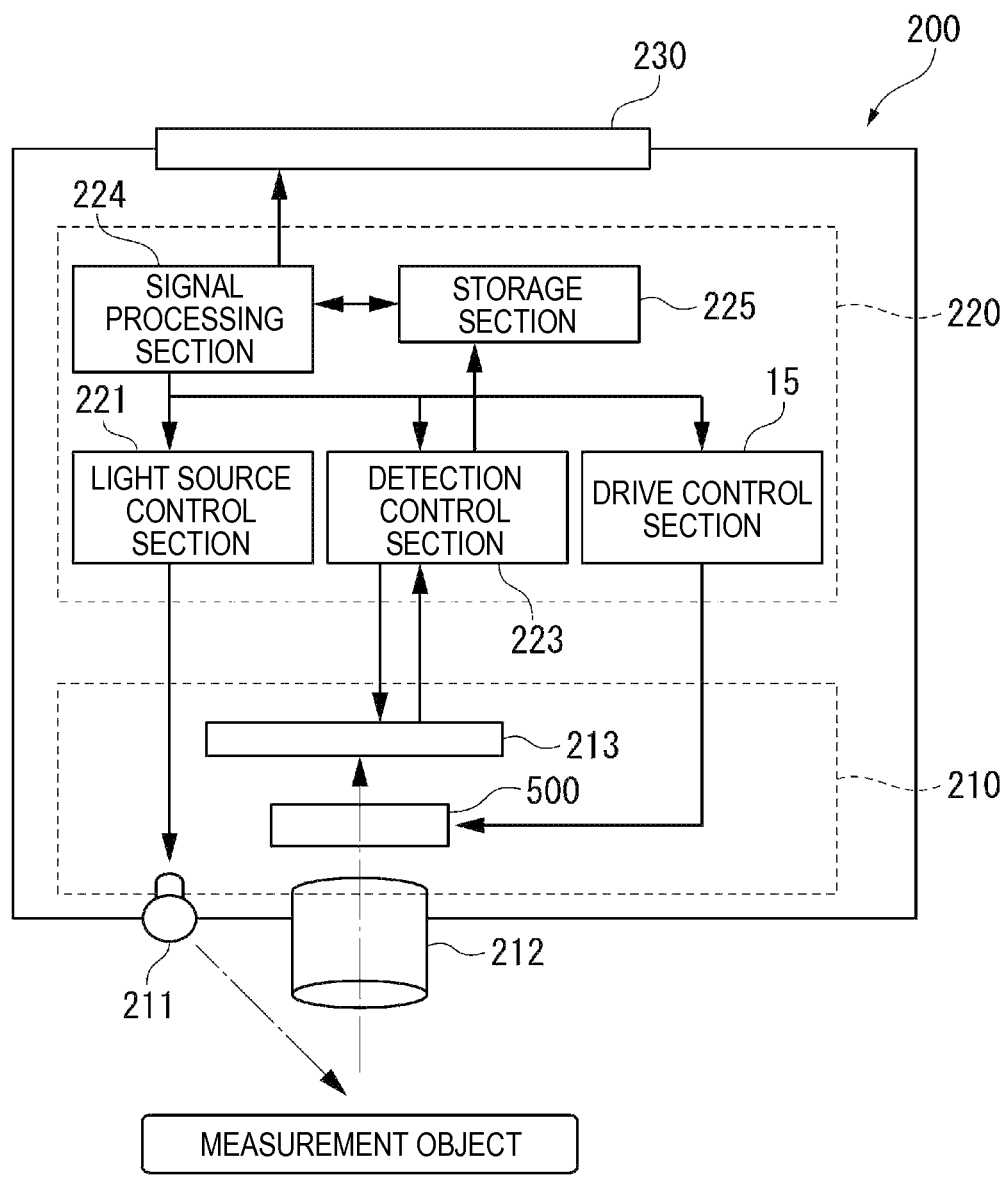
FIG. 15 is a block diagram showing a schematic configuration of a food analysis device as another example of the electronic apparatus according to the invention.

FIG. 15 is a diagram showing a schematic configuration of the food analysis device as an example of the electronic apparatus using the optical filter device according to the invention.

As shown in FIG. 15, the food analysis device 200 is provided with a detector 210 (the optical module), a control section 220, and a display section 230. The detector 210 is provided with a light source 211 for emitting light, an image pickup lens 212 to which the light from a measurement object is introduced, the optical filter device 500 for dispersing the light thus introduced from the image pickup lens 212, and an imaging section 213 (a light receiving section) for detecting the light thus dispersed. It should be noted that it is also possible to adopt a configuration in which the optical filter device 500A, 500B is disposed instead of the optical filter device 500.

Further, the control section 220 is provided with a light source control section 221 for performing lighting/extinction control of the light source 211 and brightness control of the light source in the lighting state, the drive control section 15 for controlling the optical filter device 500, a detection control section 223 for controlling the imaging section 213 and obtaining a spectral image taken by the imaging section 213, a signal processing section 224, and a storage section 225.

In the food analysis device 200, when the system is started up, the light source control section 221 controls the light source 211, and the light source 211 irradiates the measurement object with the light. Then, the light reflected by the measurement object passes through the image pickup lens 212 and then enters the optical filter device 500. The optical filter device 500 is driven with the driving method described in the description of the first embodiment under the control by the drive control section 15. Thus, the light with the target wavelength can accurately be taken out from the optical filter device 500. Then, the light thus taken out is imaged by the imaging section 213 formed of, for example, a CCD camera. Further, the light thus imaged is stored in the storage section 225 as the spectral image. Further, the signal processing section 224 controls the drive control section 15 to vary the voltage value to be applied to the optical filter device 500 to thereby obtain the spectral image corresponding to each wavelength.

Then, the signal processing section 224 performs an arithmetic process on the data of each pixel in each of the images stored in the storage section 225 to thereby obtain the spectrum in each pixel. Further, the storage section 225 stores, for example, information related to a component of food corresponding to the spectrum, and the signal processing section 224 analyzes the data of the spectrum thus obtained based on the information related to the food stored in the storage section 225, and then obtains the food component and the content thereof included in the detection object. Further, the calorie of the food, the freshness thereof, and so on can also be calculated based on the food components and the contents thus obtained. Further, by analyzing the spectral distribution in the image, it is possible to perform extraction of the portion with low freshness in the food as a test object, and further, it is also possible to perform detection of a foreign matter or the like included in the food.

Then, the signal processing section 224 performs a process of making the display section 230 display the information of the components, the contents, the calorie, the freshness, and so on of the food as the test object obtained in such a manner as described above.

Further, although the example of the food analysis device 200 is shown in FIG. 15, it is also possible to use substantially the same configuration as such a non-invasive measurement device of other information as described above. For example, the configuration can be used as a biological analysis device for performing analysis of a biological component such as measurement and analysis of a biological fluid such as blood. If a device of detecting ethyl alcohol is cited as a device for measuring the biological fluid component such as blood, such a biological analysis device can be used as a device for detecting the influence of alcohol to the driver to thereby prevent driving under the influence of alcohol. Further, the configuration can also be used as an electronic endoscopic system equipped with such a biological analysis device.

Further, the configuration can also be used as a mineral analysis device for performing component analysis of minerals.

Further, the optical filter device, the optical module, and the electronic apparatus according to the invention can be applied to the following devices.

For example, it is also possible to transmit data with the light having each of the wavelengths by temporally varying the intensity of the light having each of the wavelengths, and in this case, it is possible to extract the data transmitted with the light having a specific wavelength by dispersing the light having the specific wavelength using the variable wavelength interference filter provided to the optical module, and then making the light receiving section receive the light. Therefore, by processing the data in the light having each of the wavelengths using the electronic apparatus equipped with such a data extracting optical module, it is also possible to perform optical communication.

Further, the electronic apparatus can be applied to a spectroscopic camera for taking the spectral image by dispersing the light with the optical filter device according to the invention, and a spectroscopic analysis device. As an example of such a spectroscopic camera, there can be cited an infrared camera incorporating the variable wavelength interference filter.

Figure 16:
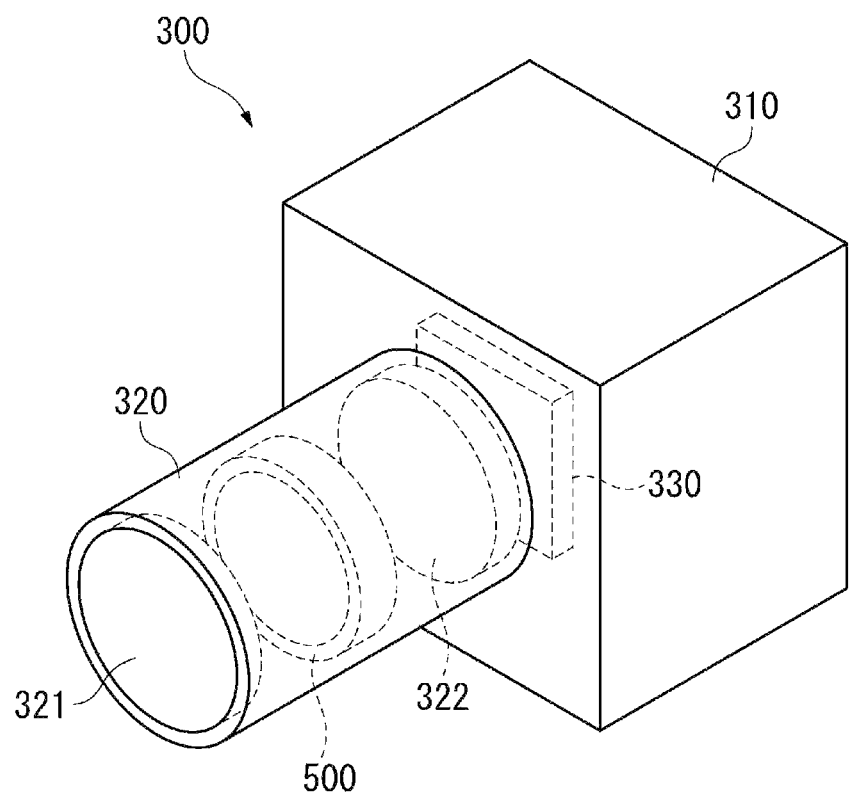
FIG. 16 is a schematic diagram showing a schematic configuration of a spectroscopic camera as another example of the electronic apparatus according to the invention.

FIG. 16 is a schematic diagram showing a schematic configuration of the spectroscopic camera. As shown in FIG. 16, the spectroscopic camera 300 is provided with a camera main body 310, an image pickup lens unit 320, and an imaging section 330.

The camera main boy 310 is a part to be gripped and operated by the user.

The image pickup lens unit 320 is provided to the camera main body 310, and guides the image light input thereto to the imaging section 330. Further, as shown in FIG. 16, the image pickup lens unit 320 is configured including an objective lens 321, an imaging lens 322, and the optical filter device 500 disposed between these lenses. It should be noted that it is also possible to adopt a configuration in which the optical filter device 500A, 500B is disposed instead of the optical filter device 500.

The imaging section 330 is formed of a light receiving element, and takes the image of the image light guided by the image pickup lens unit 320.

In such a spectroscopic camera 300, by transmitting the light with the wavelength to be the imaging object using the optical filter device 500, the spectral image of the light with a desired wavelength can be taken.

Further, the optical filter device according to the invention can be used as a filter transmitting the light with predetermined wavelength, and can also be used as, for example, an optical laser device for dispersing and transmitting only the light with a wavelength in a narrow band centered on a predetermined wavelength out of the light in a predetermined wavelength band emitted by the light emitting element using the optical filter device.

Further, the optical filter device according to the invention can also be applied to a biometric authentication device, and can also be applied to, for example, an authentication device of blood vessels, a fingerprint, a retina, an iris, and so on using the light in a near infrared range or a visible range.

Further, the optical module and the electronic apparatus each equipped with the optical filter device can be used as a concentration detection device. In this case, the infrared energy (the infrared light) emitted from the substance is dispersed by the variable wavelength interference filter and is then analyzed, and the concentration of the test object in a sample is measured.

As described above, the optical module and the electronic apparatus each equipped with the optical filter device according to the invention can be applied to any device for dispersing predetermined light from the incident light. Further, since the optical module according to the invention can disperse the light into a plurality of wavelength components with a single device as described above, the measurement of the spectrum of a plurality of wavelengths and detection of a plurality of components can be performed with accuracy. Therefore, compared to the related-art device of taking out desired wavelengths with a plurality of devices, miniaturization of the optical module and the electronic apparatus can be promoted, and the optical module and the electronic apparatus can preferably be used as, for example, a portable or in-car optical device.

Besides the above, a specific structure to be adopted when putting the invention into practice can arbitrarily be replaced with another structure and so on within the range in which the advantages of the invention can be achieved.

The entire disclosure of Japanese Patent Application No. 2013-238591 filed on Nov. 19, 2013 is expressly incorporated by reference herein.

What is claimed is:

1. An optical filter device comprising:
   a variable wavelength interference filter having a pair of reflecting films opposed to each other, and a gap changing section adapted to change a gap dimension between the pair of reflecting films; and
   at least one bandpass filter disposed on an optical axis of the pair of reflecting films,
   wherein the bandpass filter is provided with optical characteristics including a plurality of transmission wavelength bands in which light is transmitted,
   one of the plurality of transmission wavelength bands is different from another one of the plurality of transmission wavelength bands,
   intervals between the transmission wavelength bands are each larger than a half of a half bandwidth of light emitted from the variable wavelength interference filter, and
   a transmittance of light in a wavelength band other than the plurality of transmission wavelength bands of the bandpass filter is one of either equal to or lower than 10%.

2. The optical filter device according to claim 1, wherein each of the transmission wavelength bands is smaller than a half bandwidth of light emitted from the variable wavelength interference filter.

3. The optical filter device according to claim 1, wherein a plurality of the bandpass filters are disposed on the optical axis.

4. The optical filter device according to claim 1, wherein the bandpass filter is disposed on a light entrance side where the light enters the variable wavelength interference filter.

5. The optical filter device according to claim 1, wherein the bandpass filter is formed of a dielectric multilayer film.

6. The optical filter device according to claim 1, wherein the variable wavelength interference filter is provided with a substrate on which either one of the pair of reflecting films is disposed, and
the bandpass filter is disposed on the substrate.

7. The optical filter device according to claim 1, further comprising:
a housing adapted to house the variable wavelength interference filter.

8. The optical filter device according to claim 7, wherein the housing is provided with a light transmissive member disposed on the optical axis of the pair of reflecting films, and adapted to transmit the light, and
the bandpass filter is disposed on the light transmissive member.

9. The optical filter device according to claim 1, wherein the band pass filter is separate and apart from the reflecting films.

10. An optical module comprising:
an optical filter device including
a variable wavelength interference filter having a pair of reflecting films opposed to each other, and a gap changing section adapted to change a gap dimension between the pair of reflecting films, and
at least one bandpass filter disposed on an optical axis of the pair of reflecting films; and
a light receiving section adapted to receive light emitted from the optical filter device,
wherein the bandpass filter is provided with optical characteristics including a plurality of transmission wavelength bands in which light is transmitted,
one of the plurality of transmission wavelength bands is different from another one of the plurality of transmission wavelength bands,
intervals between the transmission wavelength bands are each larger than a half of a half bandwidth of light emitted from the variable wavelength interference filter, and
a transmittance of light in a wavelength band other than the plurality of transmission wavelength bands of the bandpass filter is one of either equal to or lower than 10%.

11. The optical module according to claim 10, wherein the band pass filter is separate and apart from the reflecting films.

12. The optical module according to claim 10, wherein the bandpass filter is disposed on a light entrance side where the light enters the variable wavelength interference filter.

13. An electronic apparatus comprising:
an optical filter device including
a variable wavelength interference filter having a pair of reflecting films opposed to each other, and a gap changing section adapted to change a gap dimension between the pair of reflecting films, and
at least one bandpass filter disposed on an optical axis of the pair of reflecting films; and
a control section adapted to control the optical filter device,
wherein the bandpass filter is provided with optical characteristics including a plurality of transmission wavelength bands in which light is transmitted,
one of the plurality of transmission wavelength bands is different from another one of the plurality of transmission wavelength bands,
intervals between the transmission wavelength bands are each larger than a half of a half bandwidth of light emitted from the variable wavelength interference filter, and
a transmittance of light in a wavelength band other than the plurality of transmission wavelength bands of the bandpass filter is one of either equal to or lower than 10%.

14. The electronic apparatus according to claim 13, wherein the band pass filter is separate and apart from the reflecting films.

15. The electronic apparatus according to claim 13, wherein the bandpass filter is disposed on a light entrance side where the light enters the variable wavelength interference filter.

* * * * *